United States Patent
Nakagawa et al.

(10) Patent No.: US 8,692,921 B2
(45) Date of Patent: Apr. 8, 2014

(54) IMAGING APPARATUS AND DISPLAY APPARATUS CAPABLE OF CHANGING THE ANGLE OF A DISPLAY UNIT

(75) Inventors: Keita Nakagawa, Tokyo (JP); Kei Tomatsu, Kanagawa (JP); Toshiaki Ueda, Saitama (JP)

(73) Assignee: Sony Corporation, Tokyo (JP)

( * ) Notice: Subject to any disclaimer, the term of this patent is extended or adjusted under 35 U.S.C. 154(b) by 343 days.

(21) Appl. No.: 13/137,396

(22) Filed: Aug. 11, 2011

(65) Prior Publication Data
US 2012/0081593 A1  Apr. 5, 2012

(30) Foreign Application Priority Data
Oct. 4, 2010  (JP) .................................. 2010-224898

(51) Int. Cl.
*H04N 5/222* (2006.01)
(52) U.S. Cl.
USPC ..................................................... 348/333.06
(58) Field of Classification Search
USPC ........................ 348/333.06, 333.07
See application file for complete search history.

(56) References Cited

U.S. PATENT DOCUMENTS

| | | | | |
|---|---|---|---|---|
| 7,508,439 B2 * | 3/2009 | Naito | ........................ | 348/333.06 |
| 2007/0242150 A1 * | 10/2007 | Terada | ..................... | 348/333.06 |
| 2009/0115881 A1 * | 5/2009 | Joo et al. | ................... | 348/333.06 |

FOREIGN PATENT DOCUMENTS

JP    2001-272719    10/2001

* cited by examiner

*Primary Examiner* — Albert Cutler
(74) *Attorney, Agent, or Firm* — Sony Corporation

(57) ABSTRACT

An imaging apparatus includes: a main body unit that includes an imaging lens; a display unit that displays an image picked up through the imaging lens; a hinge frame that includes a first side fixed to the main body unit so as to be rotatable around a first rotation axis, a second side facing the first side, and a combination unit, which has a notch between both end portions of the second side other than a center portion and both ends of the first side, disposed between the first side and the second side; and a rotary hinge unit that connects the second side of the hinge frame and one side of the display unit and rotates the display unit around a second rotation axis extending along the second side and a third rotation axis extending in a direction perpendicular to the second rotation axis.

17 Claims, 26 Drawing Sheets

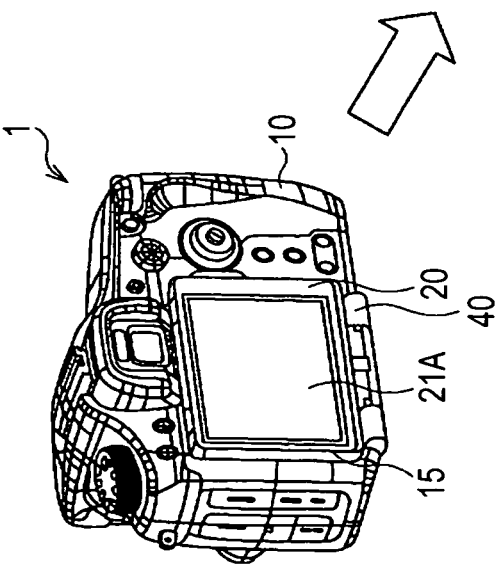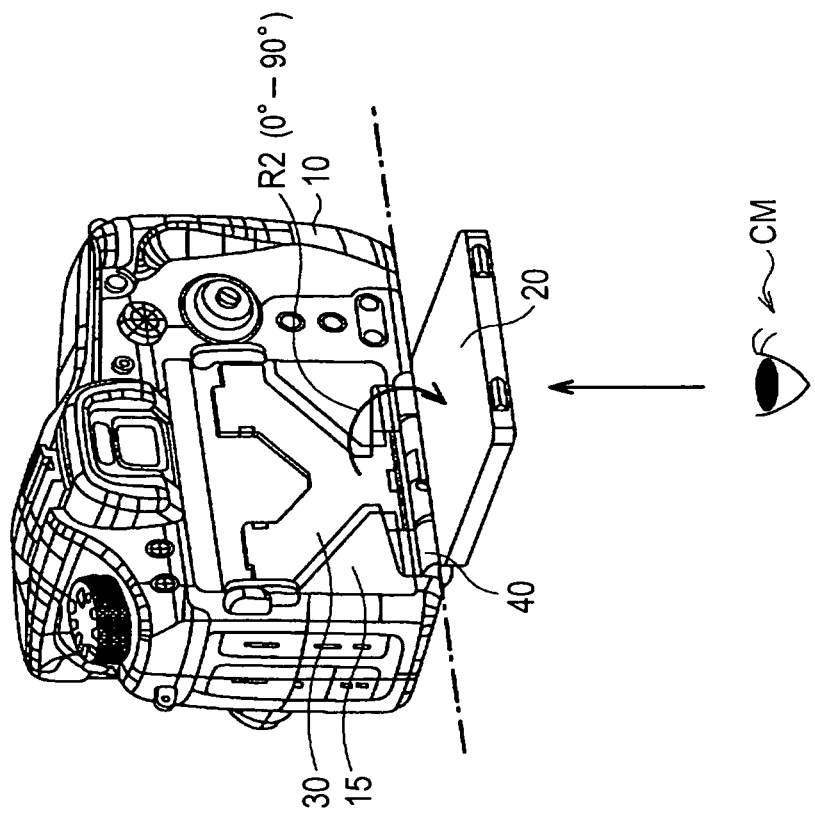

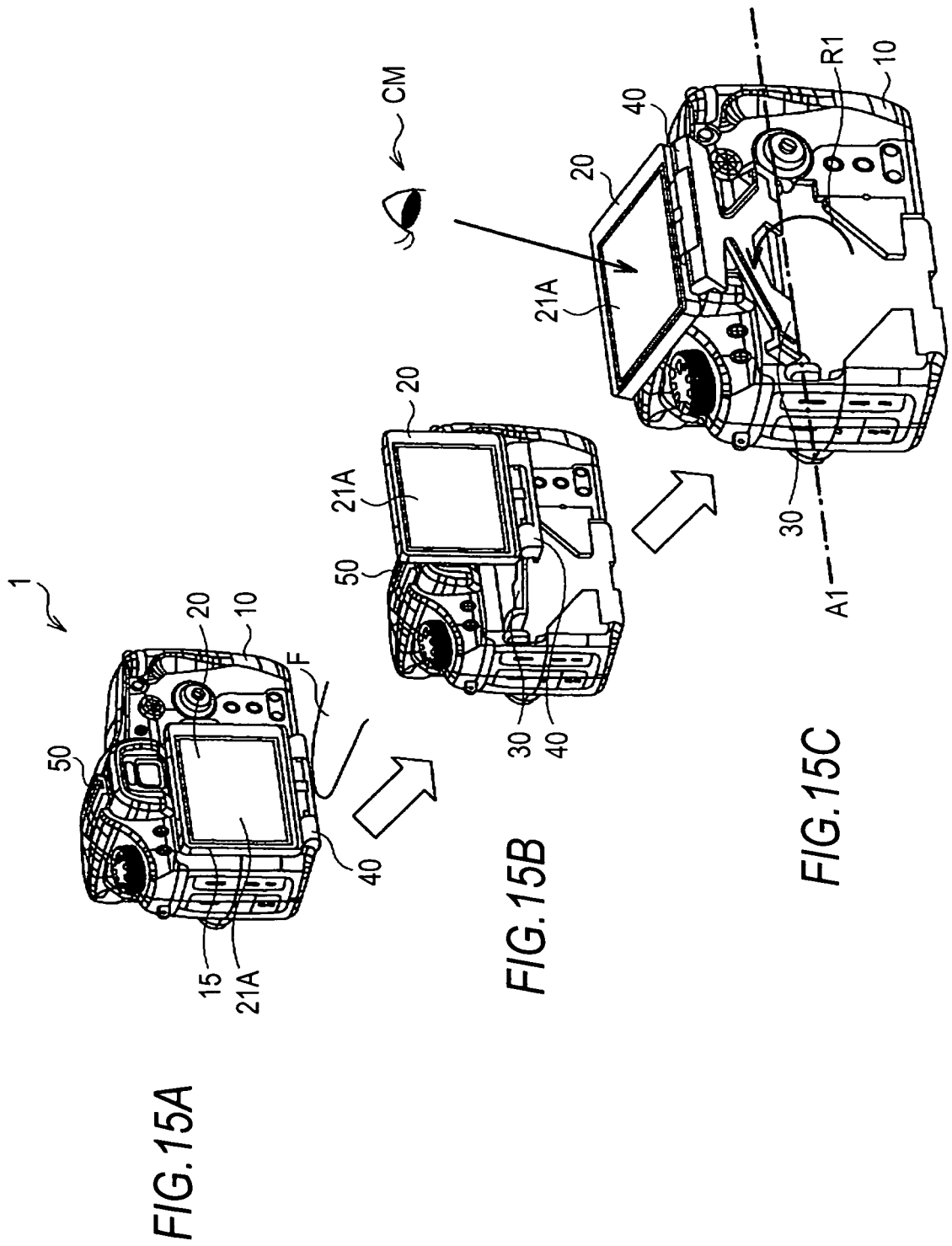

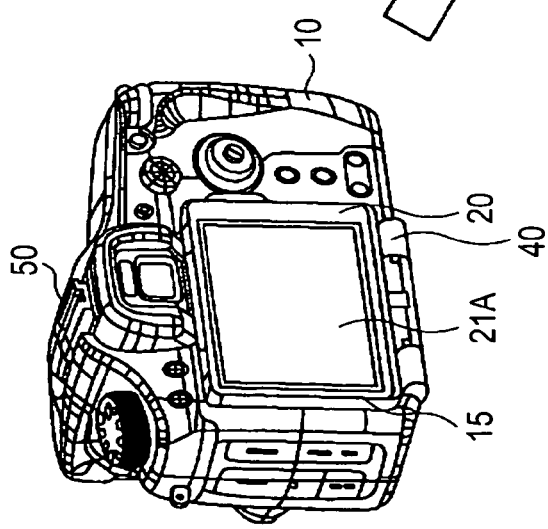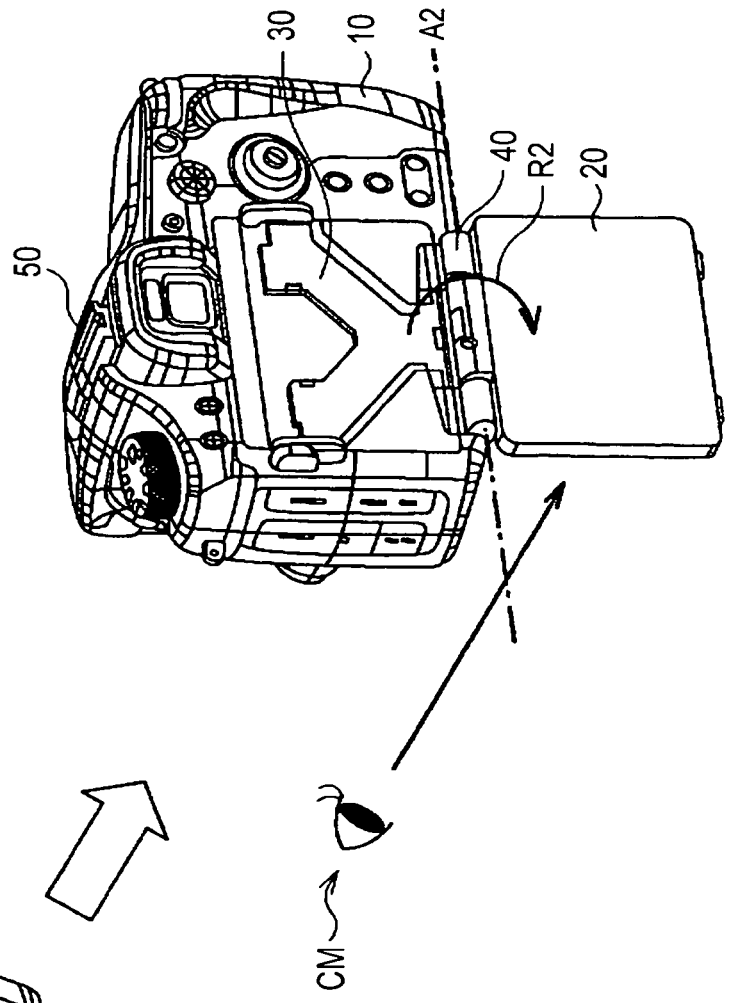

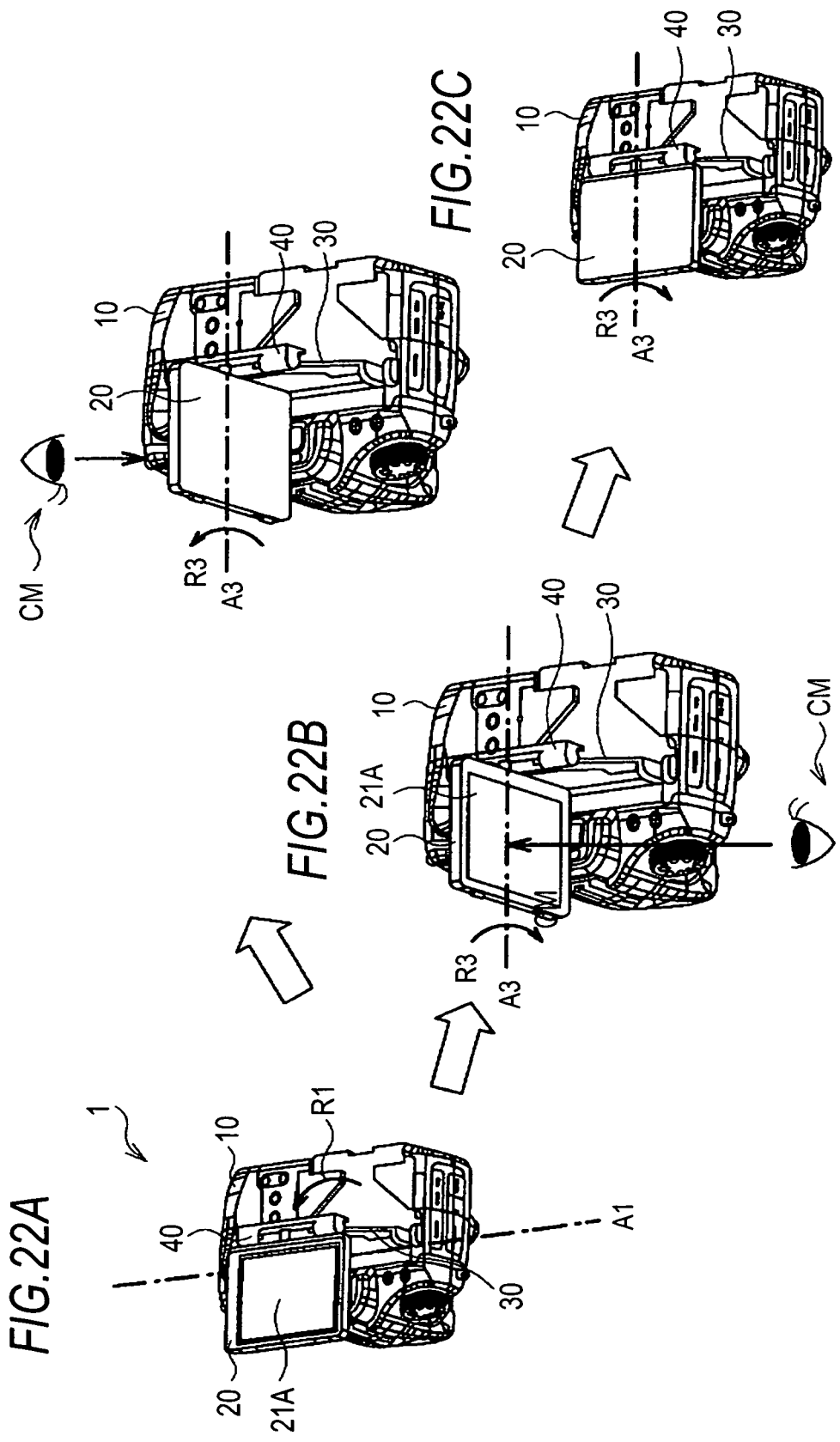

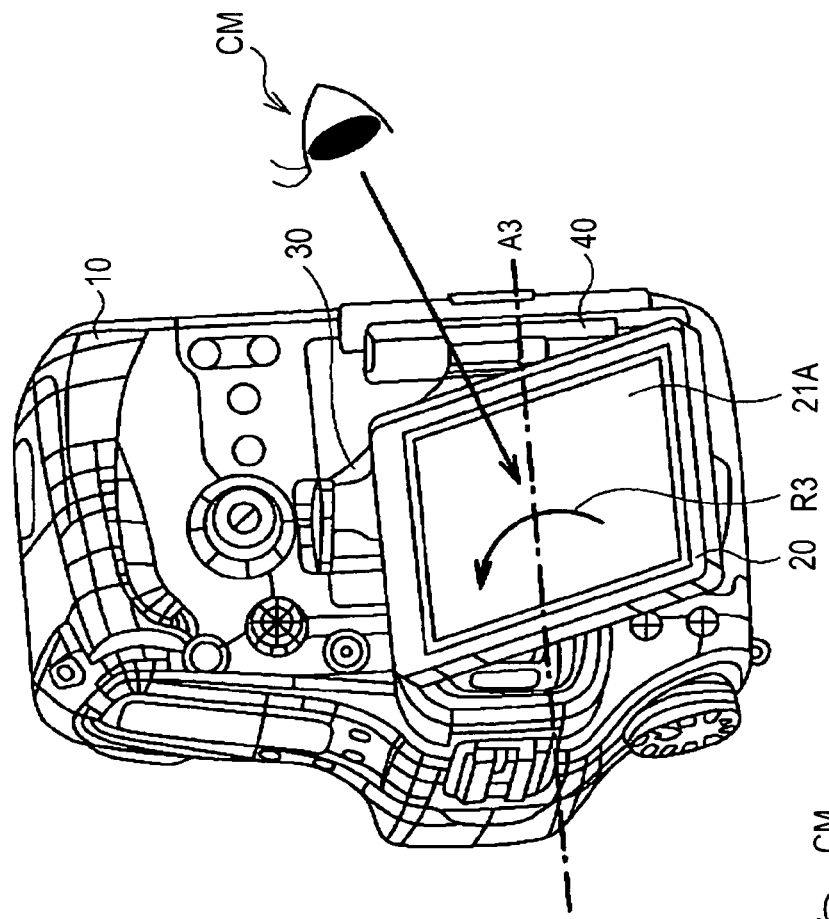
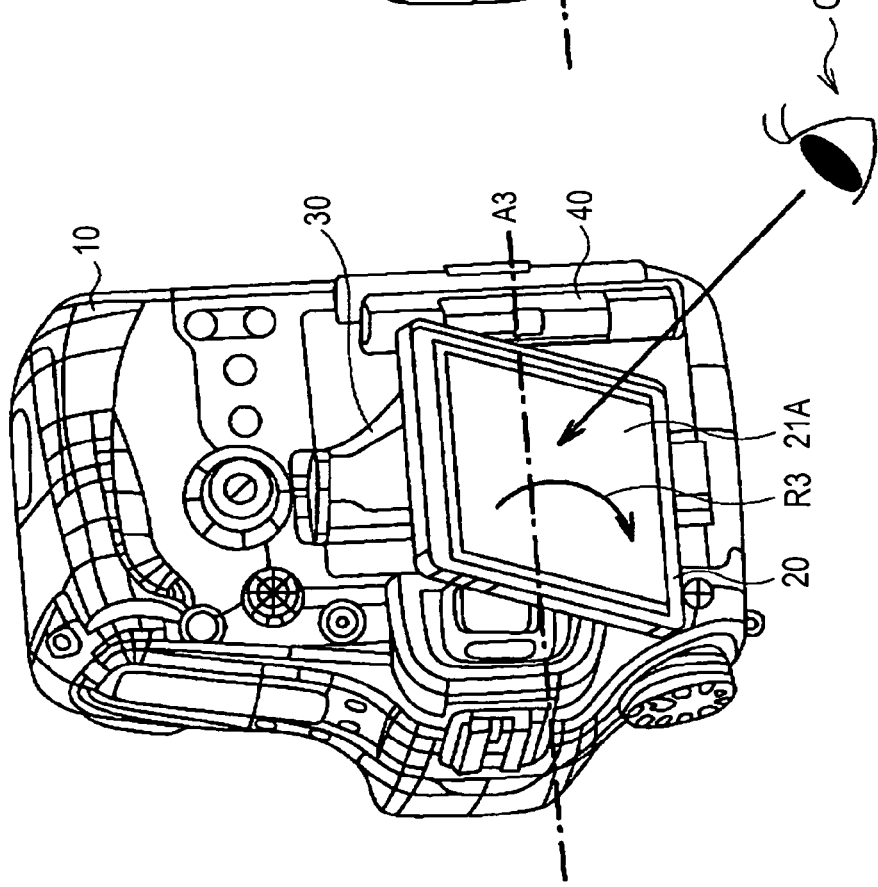

IMAGING APPARATUS AND DISPLAY APPARATUS CAPABLE OF CHANGING THE ANGLE OF A DISPLAY UNIT

FIELD

The present disclosure relates to an imaging apparatus and a display apparatus and, more particularly, to an imaging apparatus and a display apparatus that are capable of changing the angle of a display unit.

BACKGROUND

Generally, imaging apparatuses and display apparatuses are proposed in which a display unit is configured so as to be rotatable by using a rotating hinge mechanism, and the angle of the display unit can be freely changed (for example, see JP-A-2001-272719 for an imaging apparatus).

SUMMARY

However, in such a general rotating hinge mechanism, while the tilt angle of the display unit can be changed in a quite broad range in a case where the display unit is horizontally used, there is a problem in that the display unit and a main body unit are brought into contact with each other or interfere with each other when the display unit is rotated in a case where the display unit is vertically used, and accordingly, there is a room for further improvement.

Thus, it is desirable to provide an imaging apparatus and a display apparatus that are capable of changing the tilt angle of the display unit regardless of the placement of the display unit in the vertical or horizontal direction.

An imaging apparatus according to an embodiment of the present disclosure includes the following constituent elements (A) to (D):

(A) a main body unit that includes an imaging lens;
(B) a display unit that displays an image picked up through the imaging lens;
(C) a hinge frame that includes a first side fixed to the main body unit so as to be rotatable around a first rotation axis, a second side facing the first side, and a combination unit, which has a notch between both end portions of the second side other than a center portion and both ends of the first side, disposed between the first side and the second side; and
(D) a rotary hinge unit that connects the second side of the hinge frame and one side of the display unit and rotates the display unit around a second rotation axis extending along the second side and a third rotation axis extending in a direction perpendicular to the second rotation axis.

A display apparatus according to another embodiment of the present disclosure includes the following constituent elements (A) to (D):

(A) a display unit that displays an image;
(B) a main body unit that supports the display unit;
(C) a hinge frame that includes a first side fixed to the main body unit so as to be rotatable around a first rotation axis, a second side facing the first side, and a combination unit, which has a notch between both end portions of the second side other than a center portion and both ends of the first side, disposed between the first side and the second side; and
(D) a rotary hinge unit that connects the second side of the hinge frame and one side of the display unit and rotates the display unit around a second rotation axis extending along the second side and a third rotation axis extending in a direction perpendicular to the second rotation axis.

In the imaging apparatus or the display apparatus according to the embodiment of the present disclosure, the first side of the hinge frame is fixed to the main body unit so as to be rotatable around the first rotation axis, and the second side facing the first side is connected to one side of the display unit with the rotary hinge unit. The combination unit, which is disposed between the first side and the second side, has a notch between both end portions of the second side other than the center portion and both ends of the first side. Accordingly, even in a case where the display unit is arranged in any of the vertical direction and the horizontal direction, contact or interference between the display unit and the hinge frame is suppressed when the display unit is rotated around the third rotation axis.

According to the imaging apparatus or the display apparatus of the embodiment of the present disclosure, a notch is arranged between both end portions of the second side other than the center portion and both ends of the first side in the combination unit disposed between the first side and the second side of the hinge frame. Accordingly, contact or interference between the display unit and the hinge frame is suppressed when the display unit is rotated around the third rotation axis. Therefore, the inclination angle can be changed regardless of the vertical and horizontal directions of the display unit.

BRIEF DESCRIPTION OF THE DRAWINGS

FIGS. 14A and 14B are perspective views illustrating an example of horizontal-position high-angle photographing performed by the imaging apparatus shown in FIG. 1.

FIGS. 15A to 15C are perspective views illustrating a first example of horizontal-position low-angle photographing.

FIGS. 21A and 21B are perspective views illustrating a second example of the vertical-position mirror-mode photographing.

FIGS. 22A to 22D are perspective views illustrating a first example of horizontal-position high-angle and low-angle photographing.

FIGS. 25A and 25B are perspective views illustrating an operation following that illustrated in FIG. 23.

DETAILED DESCRIPTION

Hereinafter, embodiments of the present disclosure will be described with reference to the accompanying drawings. The description will be presented in the following order.
1. First Embodiment (Example of Imaging Apparatus)
2. Second Embodiment (Example of Display Apparatus)

First Embodiment

Figure 1:
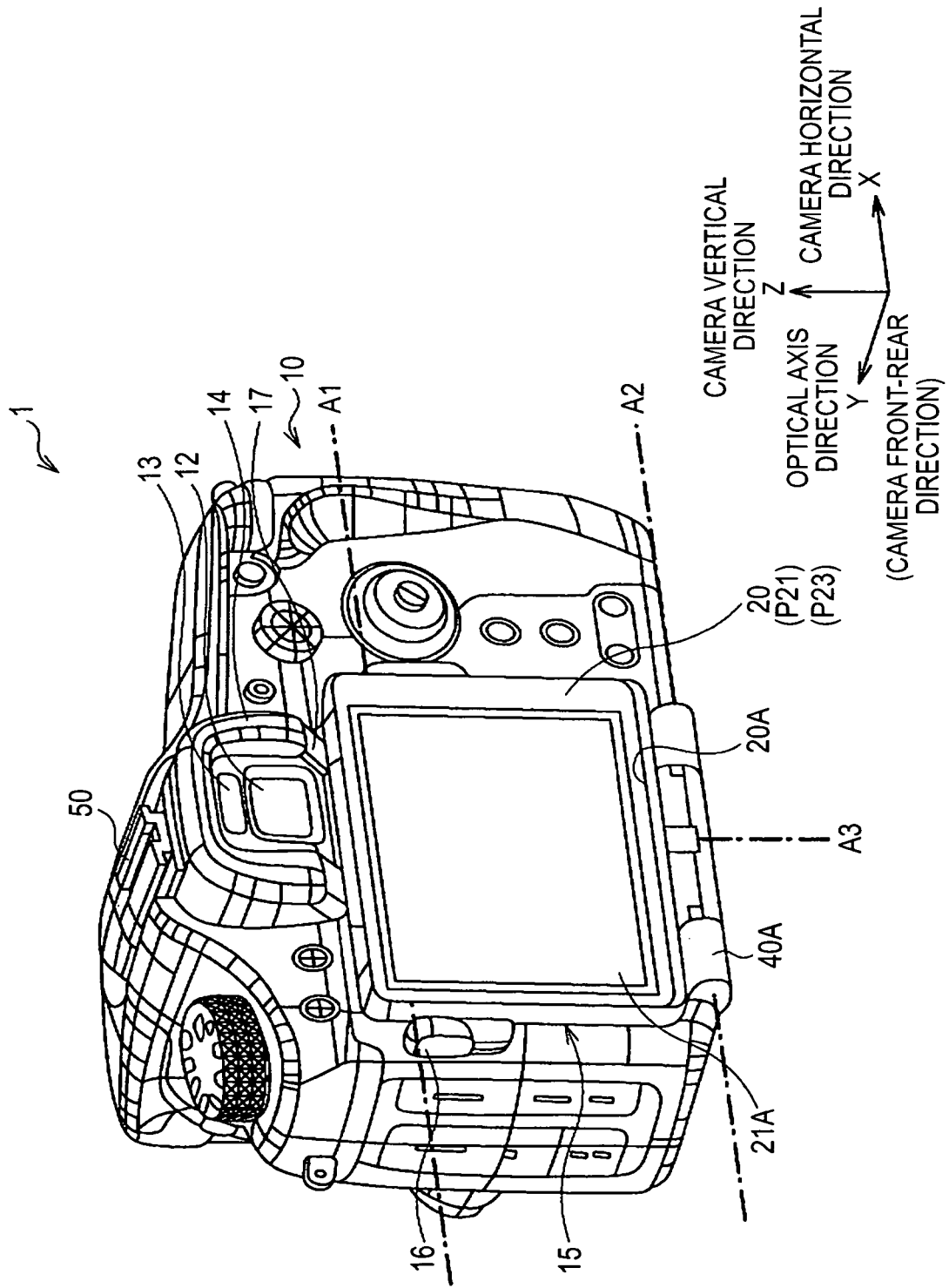
FIG. 1 is a perspective view illustrating an example of the exterior appearance of an imaging apparatus according to a first embodiment of the present disclosure.
Figure 2:
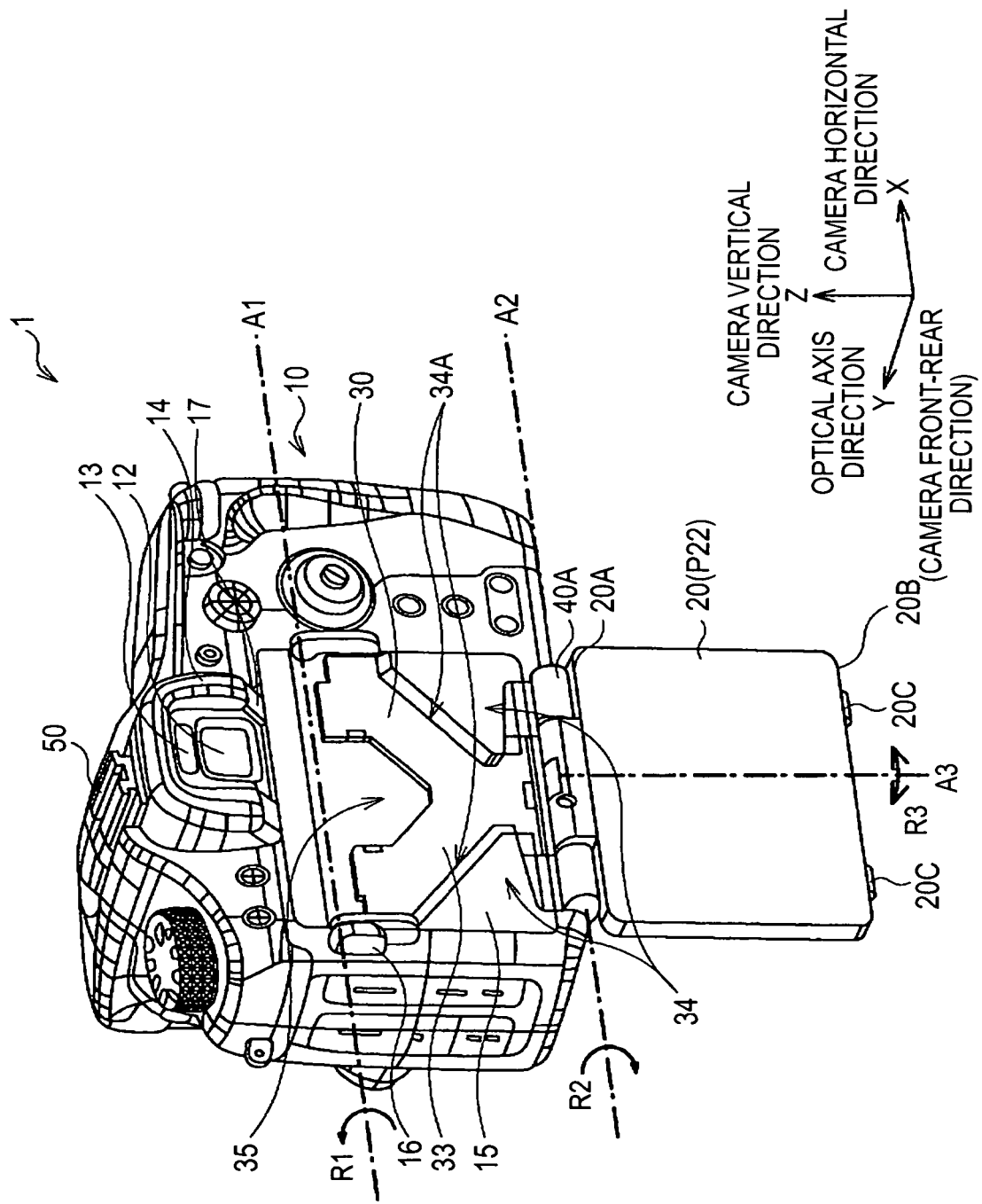
FIG. 2 is a perspective view illustrating the configuration of the rear side of a display unit in which the display unit shown in FIG. 1 is rotated to the lower side.
Figure 3:
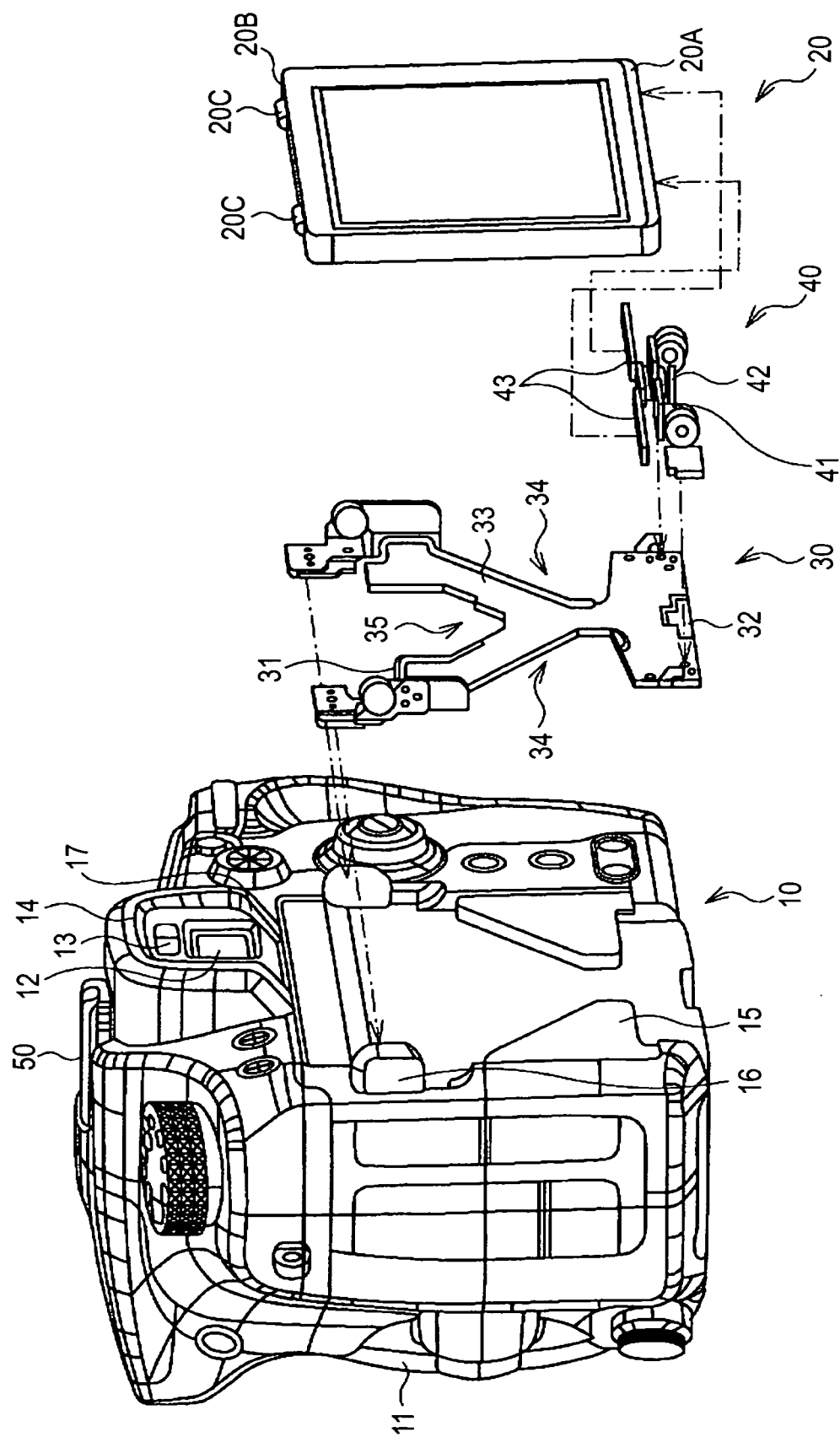
FIG. 3 is a perspective view illustrated by exploding the imaging apparatus shown in FIG. 1.

FIG. 1 illustrates the exterior appearance of an imaging apparatus (digital single-lens reflex camera), which is seen from the rear side, according to a first embodiment of the present disclosure. FIG. 2 illustrates the configuration of the rear side of a display unit in which the display unit shown in FIG. 1 is rotated to the lower side. FIG. 3 illustrates main constituent elements of the imaging apparatus 1 by exploding the imaging apparatus 1. For example, this imaging apparatus 1 has a configuration in which a display unit 20 is attached to the rear face of a main body unit 10 by using a hinge frame 30 and a rotary hinge unit 40 (see FIG. 3). As illustrated in FIGS. 1 and 2, the rotary hinge unit 40 is housed inside a rotary hinge unit cover 40A that is formed from a synthetic resin or the like. On the upper surface of the main body unit 10, an accessory shoe 50 is disposed which is used for installing an accessory such as a strobo light emitting device.

The main body unit 10 has an imaging lens 11 (see FIG. 3) with a subject (not shown in the figure) being located on the front side thereof. The main body unit 10 records an image that is picked up through the imaging lens 11 on a recording medium such as a memory or a hard disk that is built therein or a memory or a hard disk that is inserted into an external attachment slot. Above the rear face of the main body unit 10, a finder 12 is disposed. Above the finder 12, an eye sensor 13 is arranged. The eye sensor 13 may be disposed below the finder 12. Three sides of the finder 12 and the eye sensor 13 that include the upper, left, and right sides thereof are surrounded by a wall-shaped eye hood 14. The eye hood 14 may be configured so as to be detachable.

An area that is positioned on the rear face of the main body unit 10 below the finder 12 becomes a housing portion 15 of the display unit 20 and the hinge frame 30, and, as is necessary, concavities and convexities that are matched to the shapes of the display unit 20 and the hinge frame 30 are disposed. On the left and right sides above the housing portion 15, one pair of fixation units 16 that are used for supporting the hinge frame 30 are disposed. The fixation unit 16 is configured by a protruded portion that is formed integrally with a casing of the main body unit 10.

The display unit 20 displays an image that is picked up by using the imaging lens 11 and, for example, is configured by a liquid crystal display panel. The display unit 20, for example, as illustrated in FIG. 1, can be housed in the housing portion 15 of the main body unit 10 in a state of being folded together with the hinge frame 30. The display unit 20 can be rotated around a second rotation axis A2 that is parallel to an attachment side 20A of the rotary hinge unit 40 by the rotary hinge unit 40, as illustrated by arrows R2 and R3 shown in FIG. 2 and can be rotated around a third rotation axis A3 that is perpendicular to the second rotation axis A2.

Here, the second rotation axis A2, as illustrated in FIG. 2, is an axis that is perpendicular to an optical axis y and a camera vertical direction z and extends in a camera horizontal direction x and is parallel to a first rotation axis A1 to be described later. The third rotation axis A3 is an axis that is perpendicular to the camera horizontal direction x and passes through the center of two long sides of the display unit 20 that face each other. The third rotation axis A3 can be moved within a plane including the optical axis y and the camera vertical direction z in accordance with rotation of the display unit 20 around the first rotation axis A1 or the second rotation axis A2.

The maximum movable range of the display unit 20 around the second rotation axis A2 is about 180°. In other words, the display unit 20, for example, as illustrated in FIG. 1, can be rotated around the second rotation axis A2 between a closed position P21 at which the angle formed by the display unit 20 and the hinge frame 30 is 0° and, as illustrated in FIG. 2, an open position P22 at which the angle formed by the display unit 20 and the hinge frame 30 is 180°.

Figure 4:
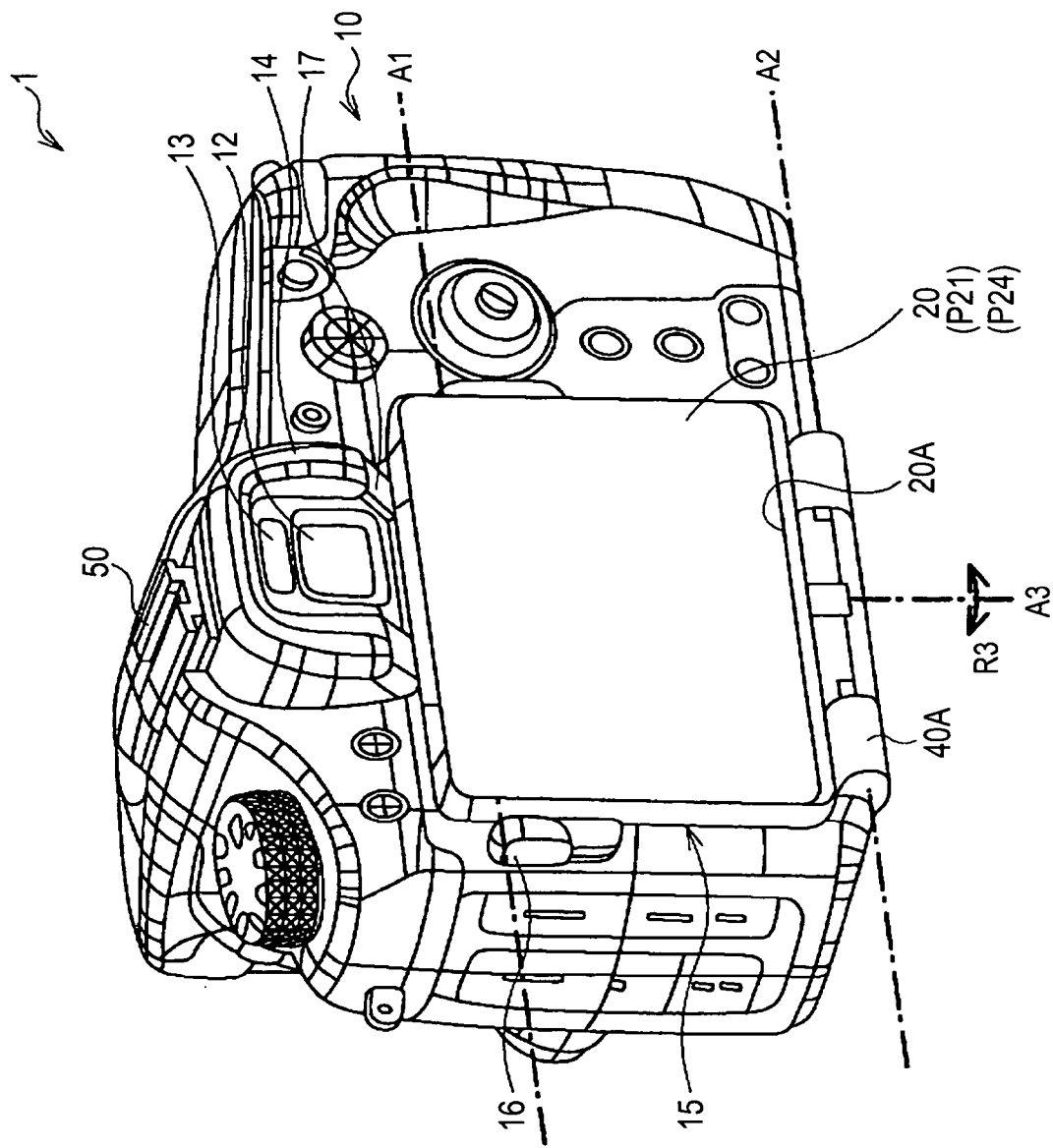
FIG. 4 is a perspective view illustrating another example of the appearance of the imaging apparatus.

Although the maximum movable range of the display unit 20 around the third rotation axis A3 differs in accordance with the angle formed by the display unit 20 and the hinge frame 30, it is about 180° in a case where the angle formed by the display unit 20 and the hinge frame 30 is equal to or larger than about 90° (including the open position P22). In this case, the display unit 20 can be rotated around the third rotation axis A3 between a non-reversed position P23 at which the display unit 20 is not rotated and a reversed position P24 at which the display unit 20 is rotated around the third rotation axis A3 by 180° from the non-reversed position P23. The non-reversed position P23, for example, as illustrated in FIG. 1, is a backward position at which the display screen 21A faces the rear face side of the main body unit 10 at the housing position of the display unit 20. On the other hand, the reversed position P24, for example, as illustrated in FIG. 4, is a forward position at which the display screen 21A faces the front face side of the main body unit 10 at the housing position of the display unit 20.

Figure 5:
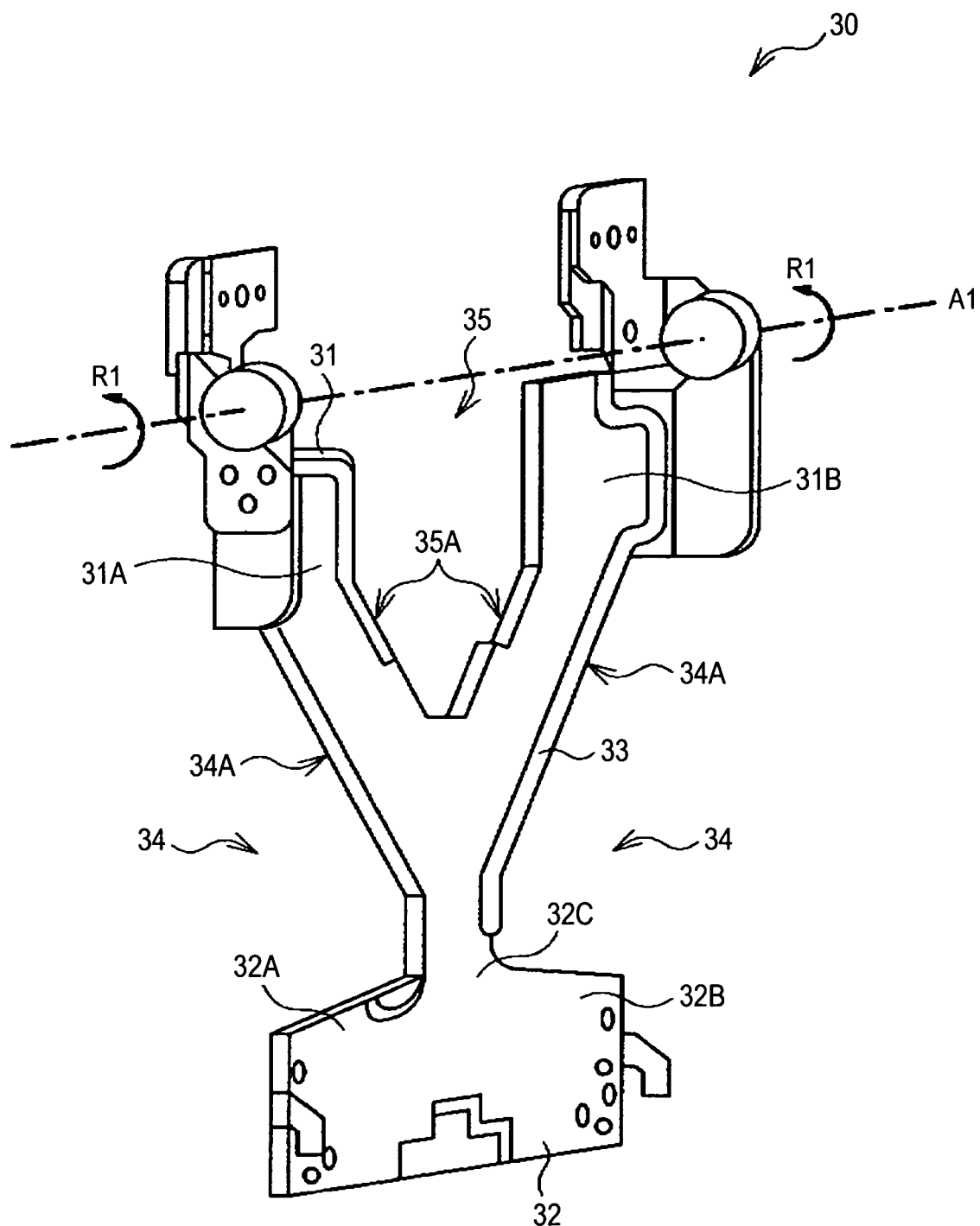
FIG. 5 is a perspective view of a hinge frame shown in FIG. 3 illustrated in an enlarged scale.

FIG. 5 illustrates the hinge frame 30 shown in FIG. 3 in an enlarged scale. The hinge frame 30 is used for connecting the main body unit 10 and the rotary hinge unit 40 to each other and increasing the rotatable range of the display unit 20. For example, the hinge frame 30 is configured by a metal plate formed of stainless steel or the like. A first side (upper side) 31 of the hinge frame 30 is fixed to the main body unit 10 so as to be rotatable around the first rotation axis A1. The first rotation axis A1, as illustrated in FIG. 2, is an axis that is perpendicular to the optical axis y and the camera horizontal direction z and extends in the camera horizontal direction x and is parallel to the second rotation axis A2. To a second side (lower side) 32 that faces the first side 31, the rotary hinge unit 40 is installed. The first side 31 and the second side 32 are combined together by a combination unit 33. This combination unit 33, for example, forms a "Y" shape having a triangular notch 34 that is horizontally symmetrical on the left and right sides thereof and a pentagonal window 35 at the center on the upper side.

Figure 6:
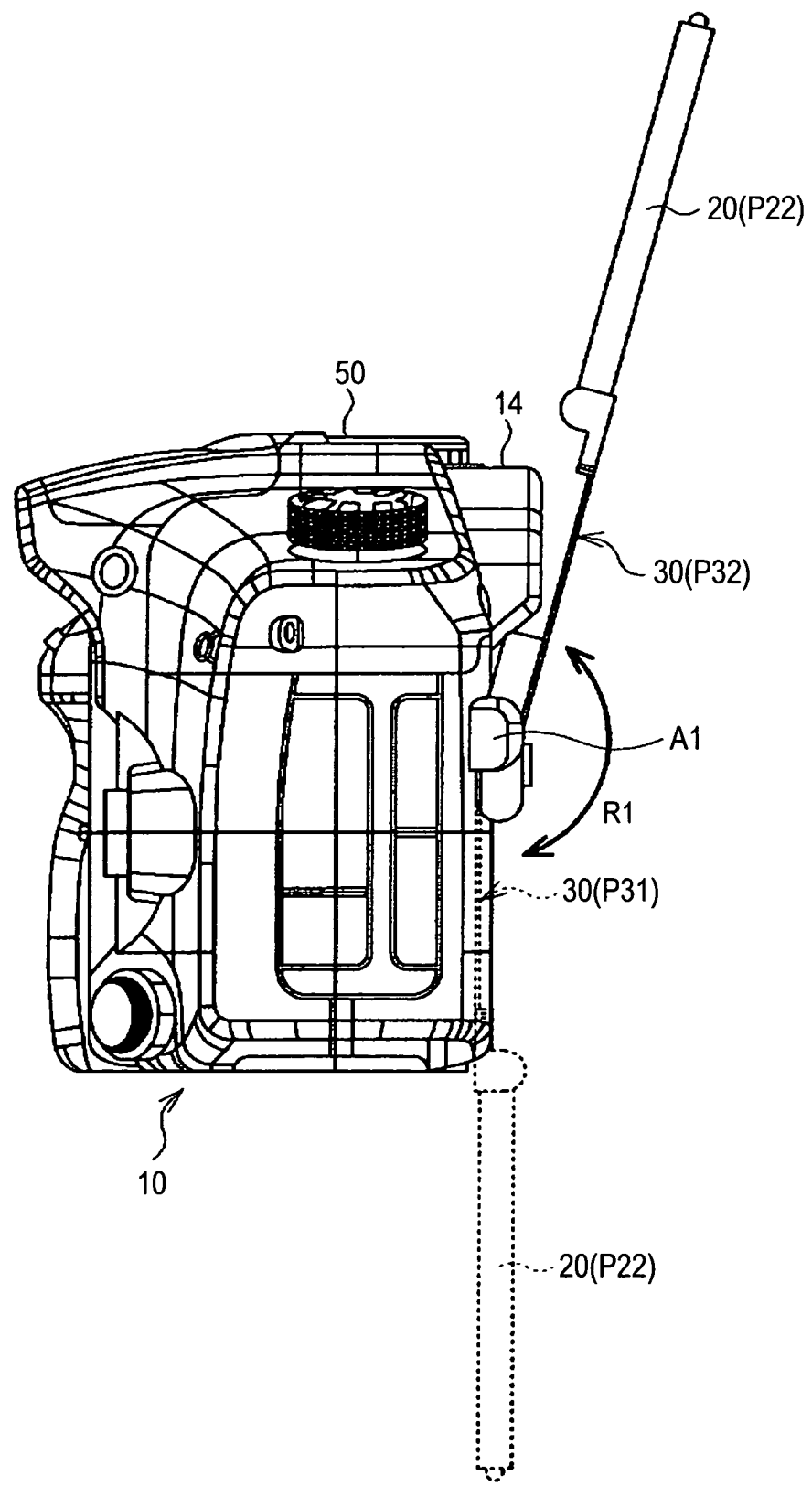
FIG. 6 is a side view illustrating the rotation range of the hinge frame.

Both ends 31A and 31B of the first side 31 are axially supported so as to be rotatable with respect to one pair of the fixation units 16 located on the rear face of the main body unit 10 by a hinge plate, and the position of the first side 31 that is axially supported becomes the first rotation axis A1. The first rotation axis A1 is installed near the lower side of the finder 12 located on the rear face of the main body unit 10. Thus, the hinge frame 30, as illustrated in FIG. 6, can be rotated around the first rotation axis A1, as illustrated by an arrow R1, between a lower position P31 (see FIGS. 1 and 2) that is brought into contact with the rear face of the main body unit 10 and an upper position P32 (see FIG. 7) that is in proximity to the finder 12.

It is preferable that the eye sensor 13 of the main body unit 10 illustrated in FIG. 1 also serves as a hinge frame opening/closing detecting sensor that detects whether or not the hinge frame 30 is located at the upper position P32. Accordingly, the position of the hinge frame 30 can be detected by using the eye sensor 13 of the imaging apparatus 1. Therefore, an additional sensor is unnecessary, whereby one sensor can be saved.

It is preferable that the first rotation axis A1, as illustrated in FIG. 1, is shifted to the second rotation axis A2 side from the position of a movable side 20B (a side opposing an attachment side 20A) that is in the housing position of the display unit 20. In other words, it is preferable that the movable side 20B is positioned so as to protrude to the upper side of the first rotation axis A1. The reason for this will be described later (see FIGS. 17A and 17B). Here, the housing position represents a position at which the display unit 20 is housed in the housing portion 15 located on the rear face of the main body unit 10, that is, a position for which the hinge frame 30 is located at the lower position P31, and the display unit 20 is located at the closed position P21.

In addition, on both sides of the lower portion of the eye hood 14 of the main body unit 10 illustrated in FIG. 1, a slope 17 is installed. The slope 17 has a lowest position on the side of the movable side 20B that is at the housing position of the display unit 20, and the position of the slope 17 becomes higher as it is farther from the lowest position (toward the upper face side of the main body unit 10 from the lower face side thereof). Furthermore, it is preferable that the slope 17 is installed outside the movable range of the movable side 20B of the display unit 20 at the time of rotating the hinge frame 30 around the first rotation axis A1. The operation of the slope 17 will be described later (see FIGS. 17A and 17B).

The notch 34 illustrated in FIG. 4 is used for avoiding contact or interference between the display unit 20 and the hinge frame 30 when the display unit 20 is rotated around the third rotation axis A3 and is disposed between both end portions 32A and 32B other than the center portion 32C of the second side 32 and both ends 31A and 31B of the first side 31.

Accordingly, in the imaging apparatus 1, the inclination angle can be changed regardless of the vertical and horizontal directions of the display unit 20.

It is preferable that the notch 34 is disposed within the rotation range of the display unit 20 around the third rotation axis A3 in a case where the angle formed by the hinge frame 30 and the display unit 20 is less than 90°. Accordingly, contact or interference between the display unit 20 and the hinge frame 30 can be reliably avoided.

More specifically, the notch 34, for example, has an approximately triangular shape and has inclination sides 34A that intersect the first side 31 between positions near both ends 31A and 31B of the first side 31 and positions near the center portion 32C of the second side 32.

Figure 7:
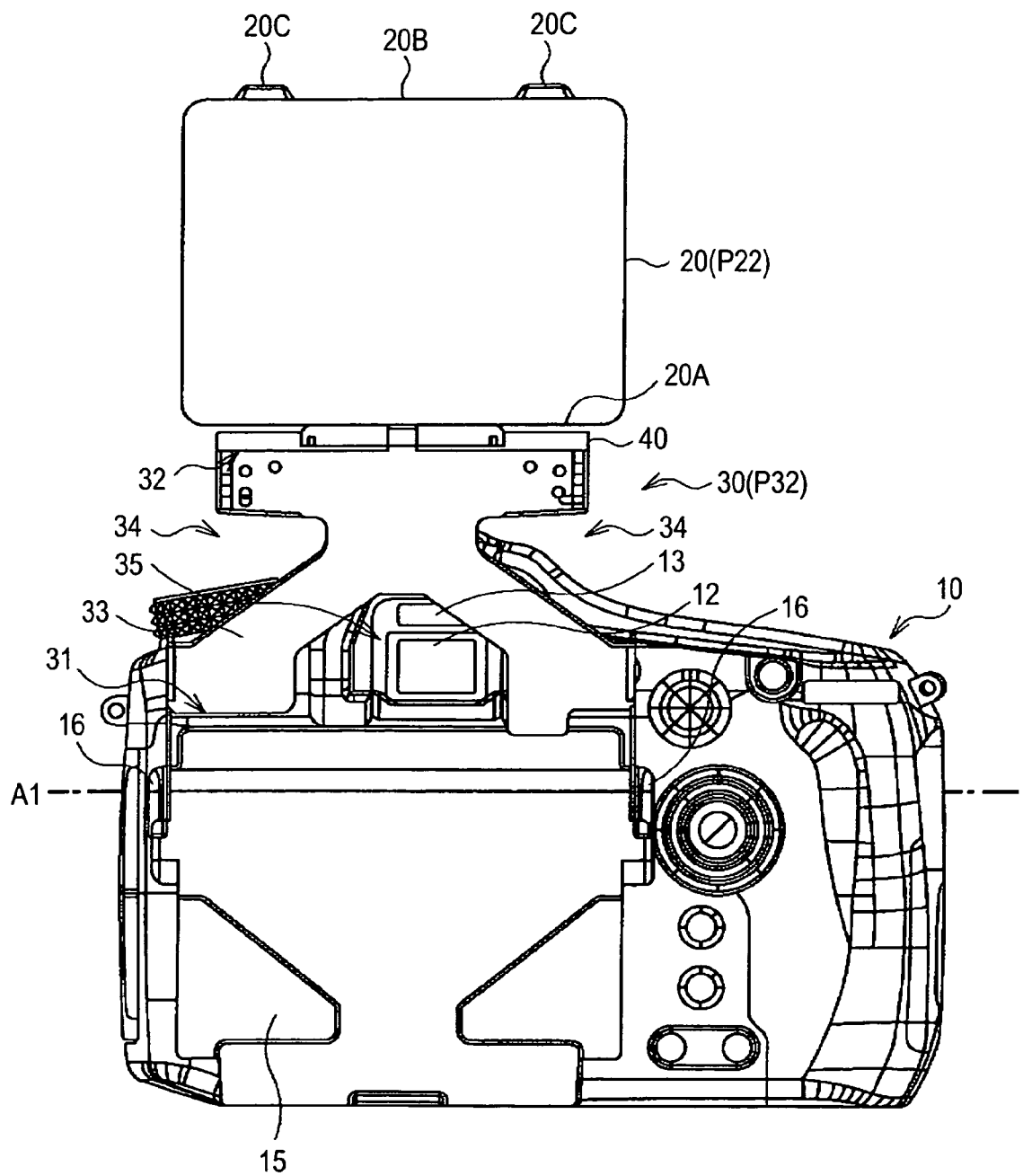
FIG. 7 is a front view illustrating the positional relationship between a window of the hinge frame and a finder of a main body unit.

The window 35 is disposed in a center portion of the combination unit 33 that is located on the side of the first side 31, that is, for example, as illustrated in FIG. 7, a position facing the finder 12 in a case where the hinge frame 30 is rotated around the first rotation axis A1 up to the upper position P32 (near the finder 12). Accordingly, at the time of mirror mode photographing to be described later, the display face of the display unit 20 can be checked by a person as a subject, and a subject can be checked from the finder 12 by a photographer. More specifically, the window 35, for example, is a pentagon that includes inclination sides 35A that are parallel to the inclination sides 34A of the notch 34.

Figure 8:
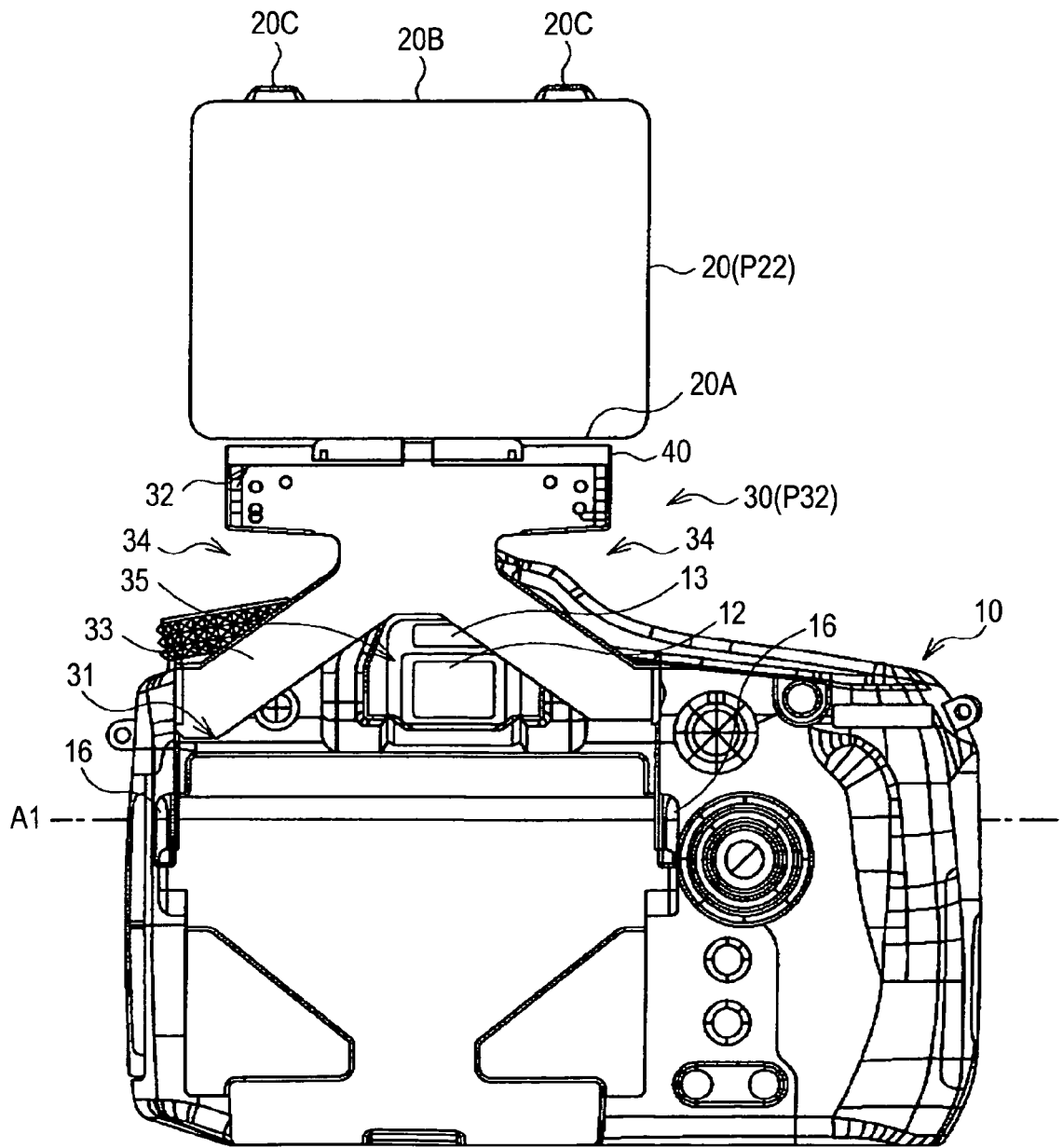
FIG. 8 is a front view illustrating a modified example of the hinge frame.
Figure 9:
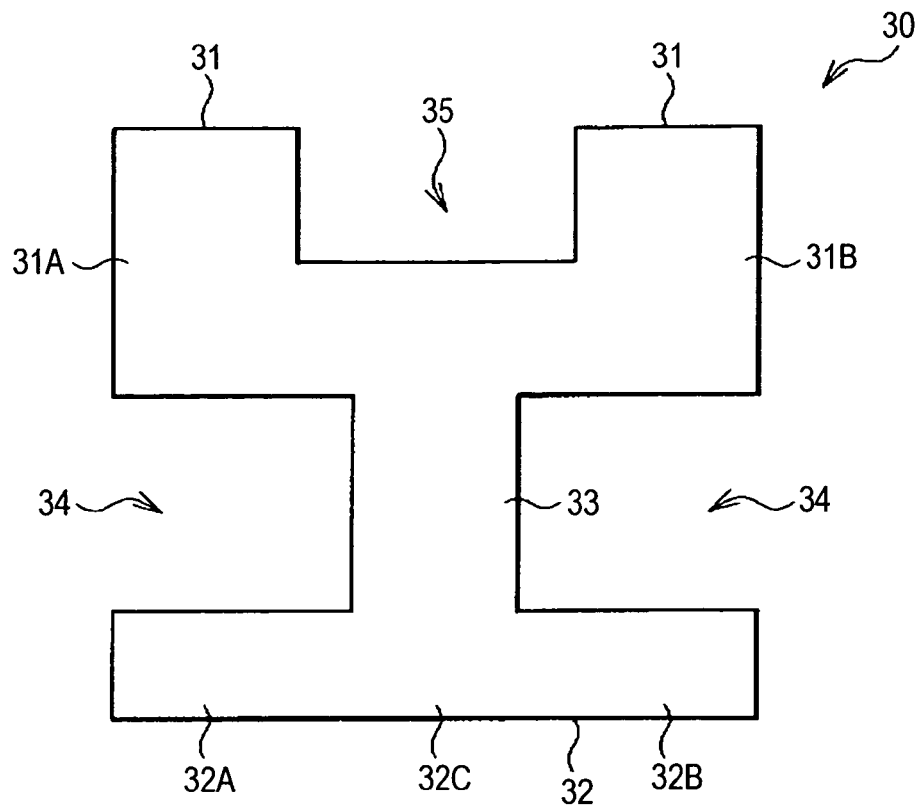
FIG. 9 is a plan view illustrating another modified example of the hinge frame.

The shapes of the notch 34 and the window 35 are not particularly limited. Thus, the notch 34 may have another shape such as a rectangular shape other than the triangular shape. In addition, the window 35 may have another shape such as a triangular shape illustrated in FIG. 8 or a rectangular shape other than the pentagon shape. The window 35, as illustrated in FIG. 5, may be a notch acquired by scooping out the center portion of the first side 31 as illustrated in FIG. 5, and a hole may be arranged at a position facing the finder 12. In addition, for example, as illustrated in FIG. 9, it may be configured such that the notch 34 and the window 35 have rectangular shapes, and the combination unit 33 has an approximate "T" shape.

Figure 10:
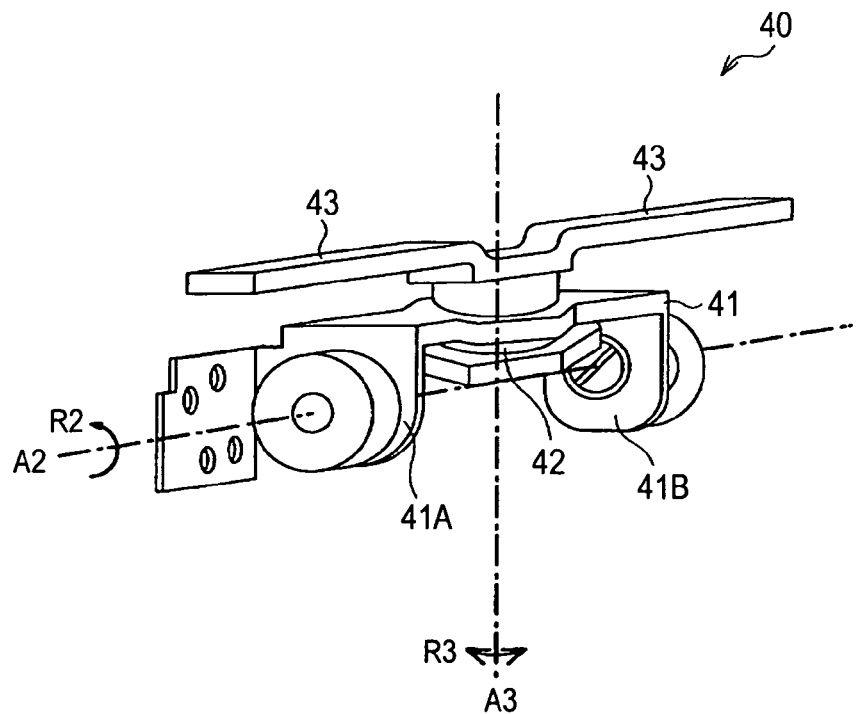
FIG. 10 is a perspective view illustrating a rotary hinge unit shown in FIG. 3 in an enlarged scale.

FIG. 10 illustrates the rotary hinge unit 40 shown in FIG. 3 in an enlarged scale. The rotary hinge unit 40 is used for rotating the display unit 20 around the second rotation axis A2 or the third rotation axis A3. For example, the rotary hinge unit 40 includes a hinge rotating member 41, a rotation shaft member 42, and a fixation plate 43. The hinge rotating member 41 is fixed to the second side 32 of the hinge frame 30 so as to be rotatable and rotates the display unit 20 around the second rotation axis A2 along the second side 32. More specifically, both ends 41A and 41B of the hinge rotating member 41 and both end portions 32A and 32B of the second side 32 are axially supported by a hinge plate so as to be rotatable.

The rotation shaft member 42 is disposed in the center portion of the hinge rotating member 41 in the longitudinal direction and rotates the display unit 20 around the third rotation axis A3 arranged in a direction perpendicular to the second rotation axis A2. The rotation shaft member 42 and the attachment side 20A of the display unit 20 are combined so as to be fixed by one pair of the fixation plates 43.

Figure 11:
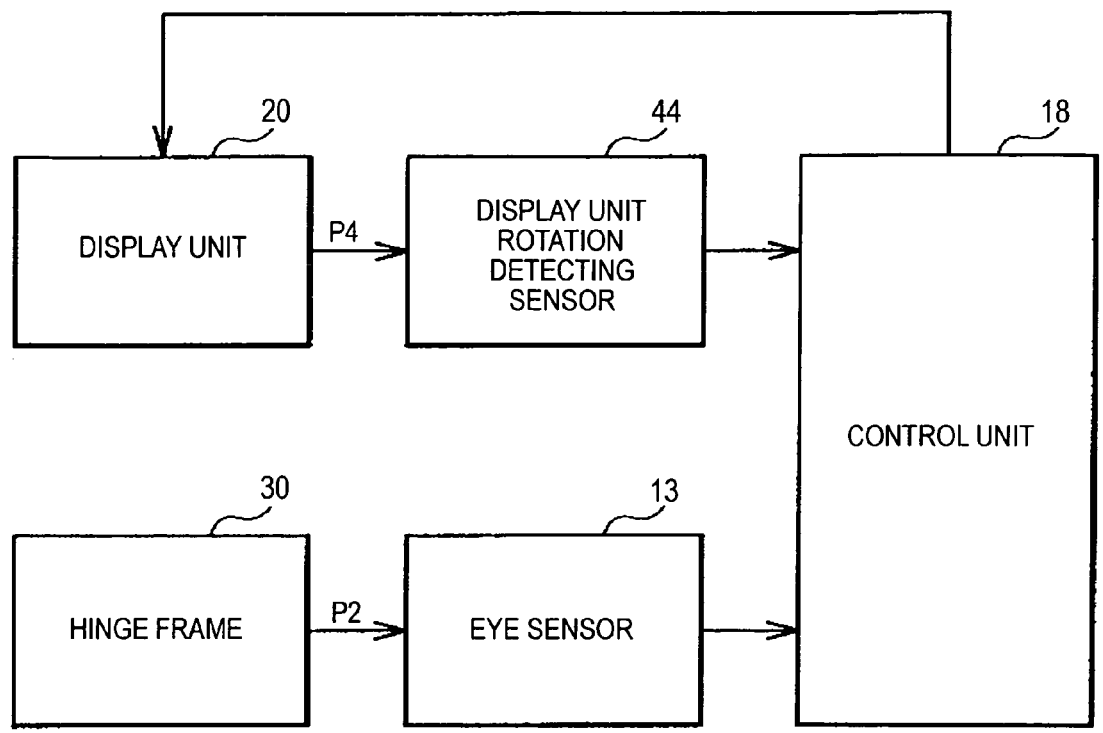
FIG. 11 is a block diagram illustrating a control system of the display unit.

FIG. 11 illustrates the control system of a display operation of the display unit 20. The display unit 20, as described above, can be reversely rotated around the third rotation axis A3 by 180° between the non-reversed position P23 illustrated in FIG. 1 and the reversed position P24 illustrated in FIG. 4. The rotation shaft member 42 includes a display unit rotation detecting sensor 44 that detects whether or not the display unit 20 is located at the reversed position P24. The display unit rotation detecting sensor 44, for example, is configured by a mechanical sensor, a magnetic sensor, or the like and is disposed inside the shaft of the rotation shaft member 42. In addition, the main body unit 10 includes a control unit 18 that controls the display unit 20 based on detection results of the eye sensor 13 as the hinge frame opening/closing detecting sensor and the display unit rotation detecting sensor 44.

Figure 12:
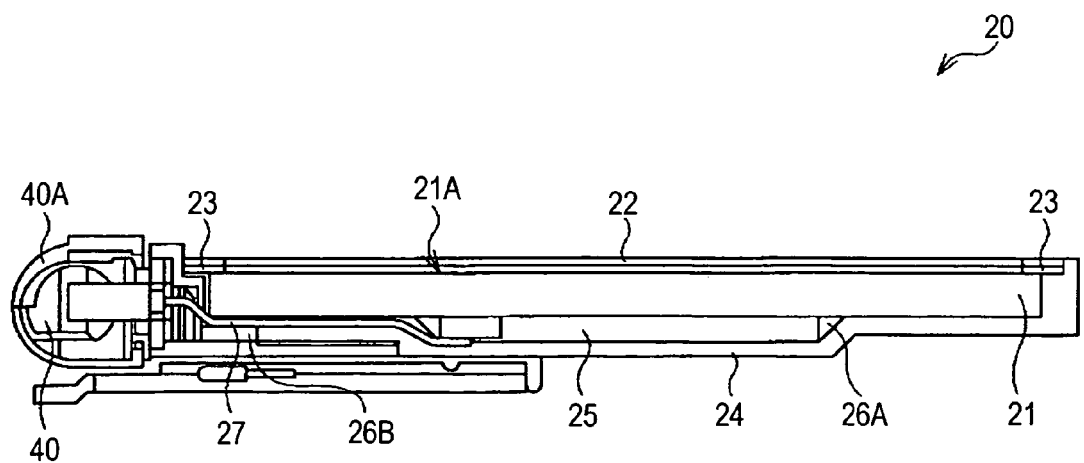
FIG. 12 is a cross-sectional view illustrating the internal configuration of the display unit shown in FIG. 1.

FIG. 12 illustrates the cross-sectional configuration of the display unit 20 at the center. The display unit 20 includes a display device 21 such as a liquid crystal. On the front side (the display screen 21A) of the display device 21, a front side plate 22 that is formed from a transparent material such as glass is arranged for protection or acquisition of the strength of the display device 21. Between the display device 21 and the front side plate 22, a double-coated adhesive tape 23 used for a seal is disposed extending over the entire periphery of the display device 21.

The side face and the rear face of the display device 21 are coated with a casing (rear cover) 24. Between the rear face of the display device 21 and the casing 24, a relay substrate 25 that is used for driving the display device 21 is housed. Into the periphery of the relay substrate 25, a first packing 26A is inserted.

Figure 13:
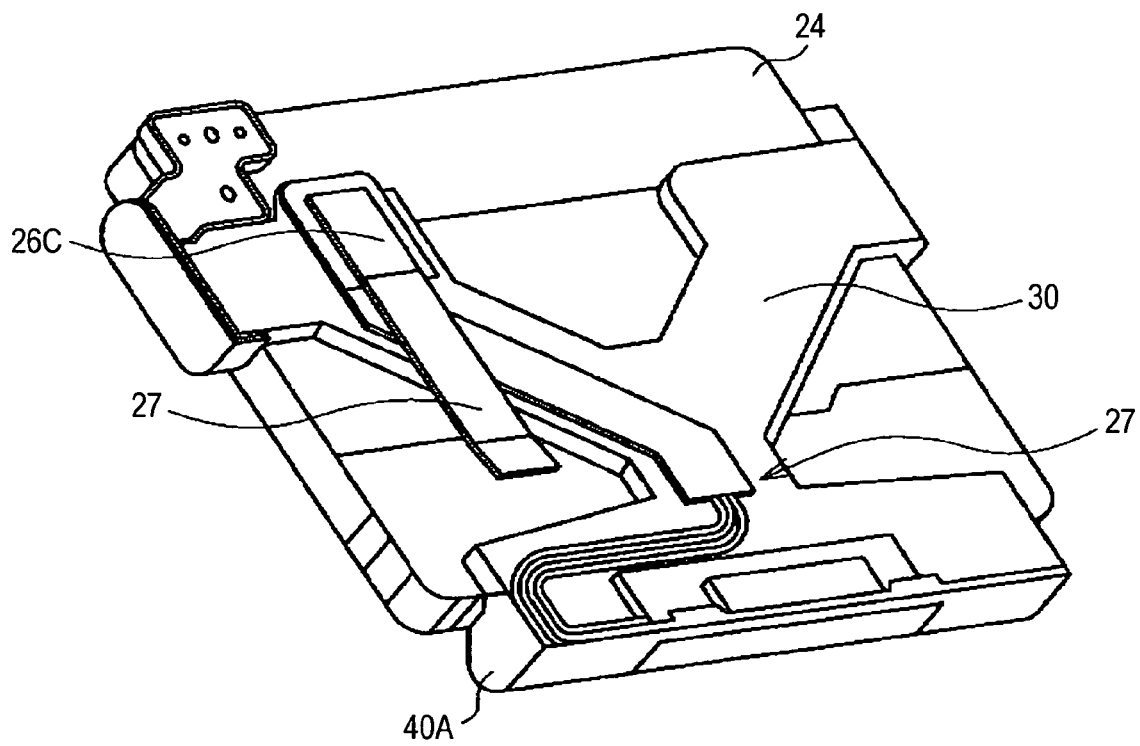
FIG. 13 is a perspective view illustrating the configuration of the display unit seen from the rear side.

A cable 27 that is, for example, configured by a thin coaxial cable is connected to the relay substrate 25. This cable 27, for example, as illustrated in FIG. 13, connects the relay substrate 25 and the main body unit 10 through the hinge frame 30 and the rotary hinge unit 40. The cable 27 is disposed so as to extend along the hinge frame 30 in a parallel state in which a plurality of central lines are flatly aligned inside the hinge frame 30. In addition, the cable 27 is changed from the parallel state to a wound state in which a plurality of central lines are bundled at the boundary between the hinge frame 30 and the rotary hinge unit 40, and the cable 27 is disposed in a state of passing through a hole disposed at the center of the axis of the rotary hinge unit 40 in the wound state or a state of being coiled around the rotation axis of the rotary hinge unit 40.

A portion of the cable 27 that is inserted into the casing 24 of the display unit 20 from the rotary hinge unit 40, as illustrated in FIG. 12, is sandwiched by a second packing 26B. In addition, as illustrated in FIG. 13, a portion of the cable 27 that is inserted into the hinge frame 30 from the main body unit 10 (not shown in FIG. 13, see FIG. 1) is sandwiched by a third packing 26C. By performing partial sealing at a minimum requisite by using the double-coated adhesive tape 23, the first packing 26A, the second packing 26B, and the third packing 26C, dust-proof and drip-proof of the display unit 20 are achieved.

Hereinafter, the operations of the imaging apparatus 1 will be described with reference to FIGS. 14A to 28B.
(Horizontal-Position High-Angle Photographing)

FIGS. 14A and 14B illustrate an example of horizontal-position high-angle photographing performed by using the imaging apparatus 1. Here, the "horizontal-position high-angle" represents a photographing method in which the imaging apparatus 1 is held in the landscape orientation and is set to a high position (for example, above the head). First, as illustrated in FIG. 14A, the imaging apparatus 1 is set to a horizontal position, and an operation is started from a state in which the display screen 21A of the display unit 20 is arranged to the outer side (the rear face side), and the display unit 20 is housed in the housing portion 15. Next, as illustrated in FIG. 14B, the display screen 21A of the display unit 20 is arranged to face the lower side by rotating the display unit 20 around the second rotation axis A2 to the lower side by 0° to 90° (in FIG. 14B, for example, 90°) as denoted by an arrow R2. Accordingly, the imaging apparatus 1 is set above the head, and a photographer CM can perform photographing by visually recognizing the display screen 21A of the display unit 20 from the lower side.
(First Example of Horizontal-Position Low-Angle Photographing)

Figure 16:
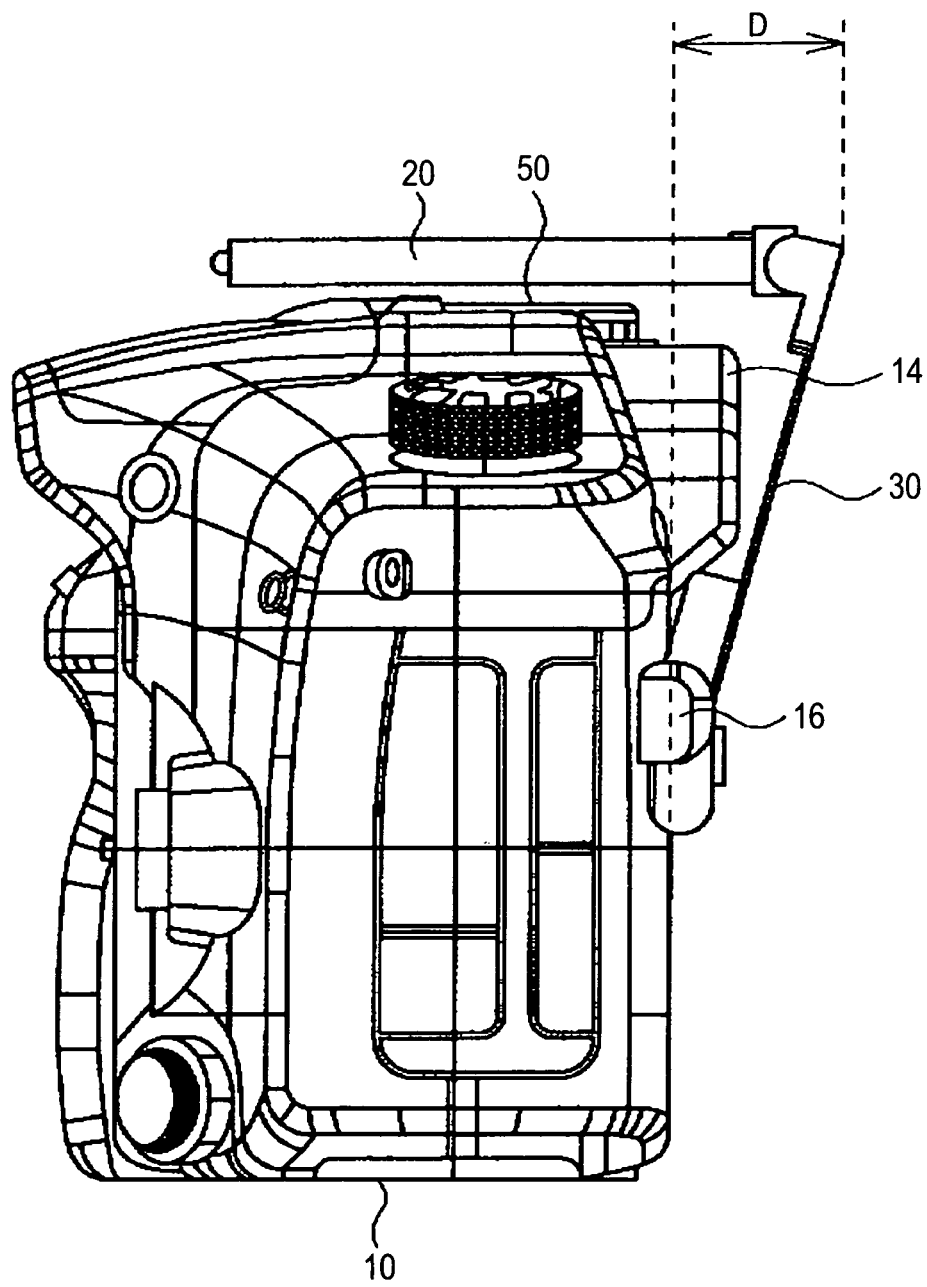
FIG. 16 is a side view of FIG. 15C.

FIGS. 15A to 15C and 16 illustrate an example of horizontal-position low-angle photographing using the imaging apparatus 1. Here, the "horizontal-position low-angle" represents a photographing method in which the imaging apparatus 1 is held in the landscape orientation and is set to a low position (for example, the abdomen). First, as illustrated in FIG. 15A, the imaging apparatus 1 is set to a horizontal position, and an operation is started from a state in which the display screen 21A of the display unit 20 is arranged to the outer side (the rear face side), and the display unit 20 is housed in the housing portion 15. Next, the display unit 20 is floated from the main body unit 10 as illustrated in FIG. 15B by lifting the rotary hinge unit 40 with a finger F as illustrated in the same FIG. 15A. Subsequently, as illustrated in FIGS. 15C and 16, by further lifting the display unit 20, the display screen 21A of the display unit 20 is turned up so as to load the display unit 20 onto the upper face (on the accessory shoe 50) of the imaging apparatus 1. Accordingly, the imaging apparatus 1 is set below the position of the eyes of the photographer CM, and the photographer CM can perform photographing by visually recognizing the display screen 21A of the display unit 20 from the upper side. In addition, as illustrated in FIG. 16, since the amount D of protrusion of the hinge frame 30 and the display unit 20 from the rear face of the main body unit 10 is small, the imaging apparatus 1 can be attached to the body, whereby photographing with small blur can be performed in a stable posture.

Figure 17B:
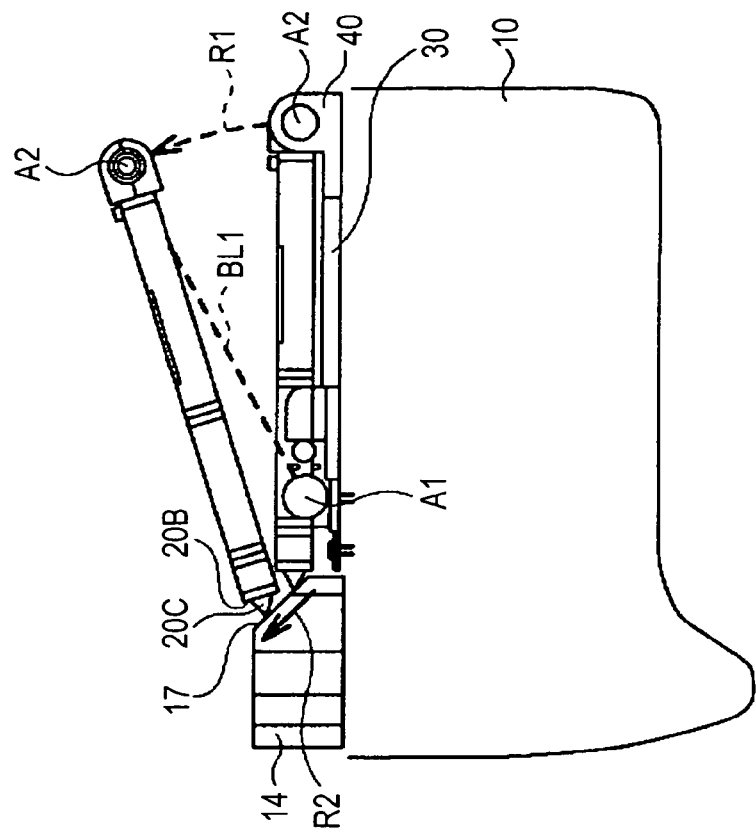
FIGS. 17A and 17B are a perspective view and a side view illustrating the operations of constituent elements until the state shown in FIG. 15B is reached from the state shown in FIG. 15A.
Figure 17A:
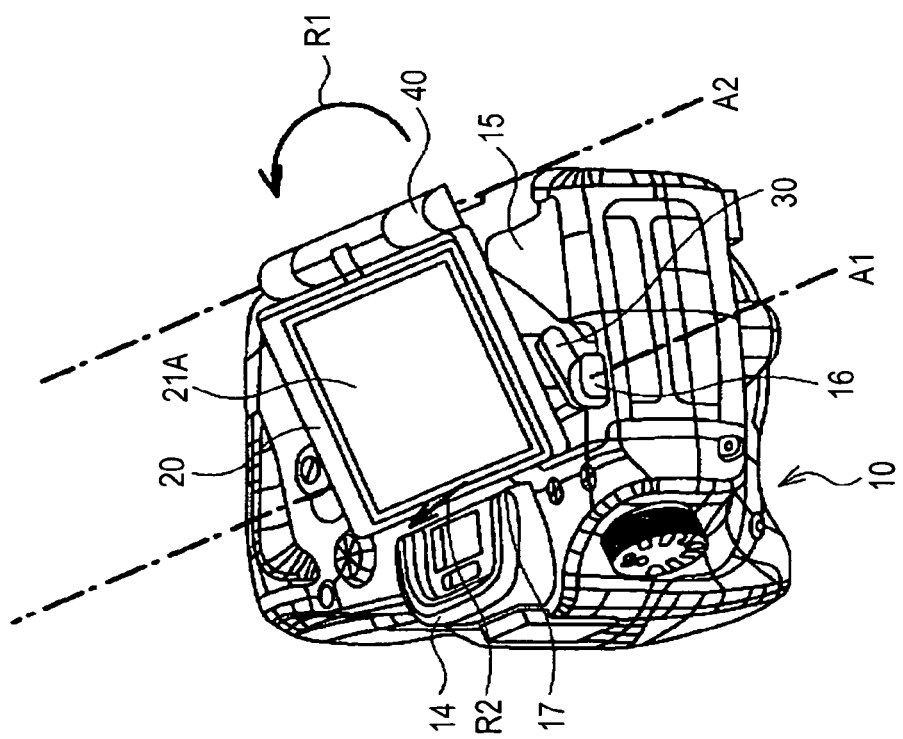

FIGS. 17A and 17B illustrate the operations of constituent elements until the state shown in FIG. 15B is reached from the state shown in FIG. 15A. As illustrated in FIG. 15A, when the rotary hinge unit 40 is lifted by the finger F, as illustrated by an arrow R1 and a broken line BL1 shown in FIGS. 17A and 17B, the hinge frame 30 is rotated around the first rotation axis A1.

Here, as described above, the first rotation axis A1 is deviated to the second rotation axis A2 side from the position of the movable side 20B that is at the housing position of the display unit 20. In other words, the movable side 20B is positioned so as to protrude to the upper side from the first rotation axis A1. Accordingly, the movable side 20B of the display unit 20 is floated, as denoted by the arrow R2 shown in FIGS. 17A and 17B in accordance with the rotation (the arrow R1 and a broken line BL1) of the hinge frame 30 around the first rotation axis A1. Accordingly, by performing only one operation of lifting up the rotary hinge unit 40 with the finger F, the hinge frame 30 can be rotated around the first rotation axis A1 (the arrow R1 and the broken line BL1), and the movable side 20B of the display unit 20 can be floated (the arrow R2), whereby the convenience of a photographer is improved.

In contrast to this, in a case where the first rotation axis A1 is located at the same position as that of the movable side 20B that is at the housing position of the display unit 20, the movable side 20B of the display unit 20 is not floated even in a case where the hinge frame 30 is rotated around the first rotation axis A1. Accordingly, in such a case, after the operation of lifting up the rotary hinge unit 40 with the finger F, an additional operation of lifting up the movable side 20B of the display unit 20 with the finger is necessary, whereby it takes time.

In addition, as described above, below the eye hood 14 of the main body unit 10, the slope 17 is disposed. This slope 17 has the lowest position on the side of the movable side 20B that is at the housing position of the display unit 20, and the position of the slope 17 becomes higher as it is located farther from the lowest position. Accordingly, when the movable side 20B of the display unit 20 is floated, there is no case in which the movable side 20B of the display unit 20 is brought into contact with the lower portion of the eye hood 14 so as to block the uplift thereof. Accordingly, the movable side 20B of the display unit 20, as denoted by the arrow R2 shown in FIGS. 17A and 17B, is slid up along the slope 17, and the display unit 20 is rotated around the second rotation axis A2. Therefore, the display unit is floated so as to be located farther from the hinge frame 30 by using the slope 17 as a guide face, and, as illustrated in FIG. 15B, a state is formed in which the display unit 20 is floated from the main body unit 10.

In addition, it is preferable that the slope 17 is disposed outside the movable range of the movable side 20B of the display unit 20 when the hinge frame 30 is rotated around the first rotation axis A1. Accordingly, it can be reliably avoided that the movable side 20B is brought into contact with the lower portion of the eye hood 14 when the movable side 20B of the display unit 20 is floated.

In addition, it is preferable that the display unit 20, as illustrated in FIGS. 17A and 17B and FIG. 2, includes a peak-shaped protrusion 20C of which the tip end is sharpened toward the slope 17 at a position facing the slope 17 of the movable side 20B. In such a case, when the movable side 20B of the display unit 20 is slid up along the slope 17, the movable side 20B moves while being brought into contact with the slope 17 while the tip end of the protrusion 20C used as a guide. Therefore, the sliding-up operation of the display unit 20 can be more smoothly performed.

(Second Example of Horizontal-Position Low-Angle Photographing)

Figure 18:
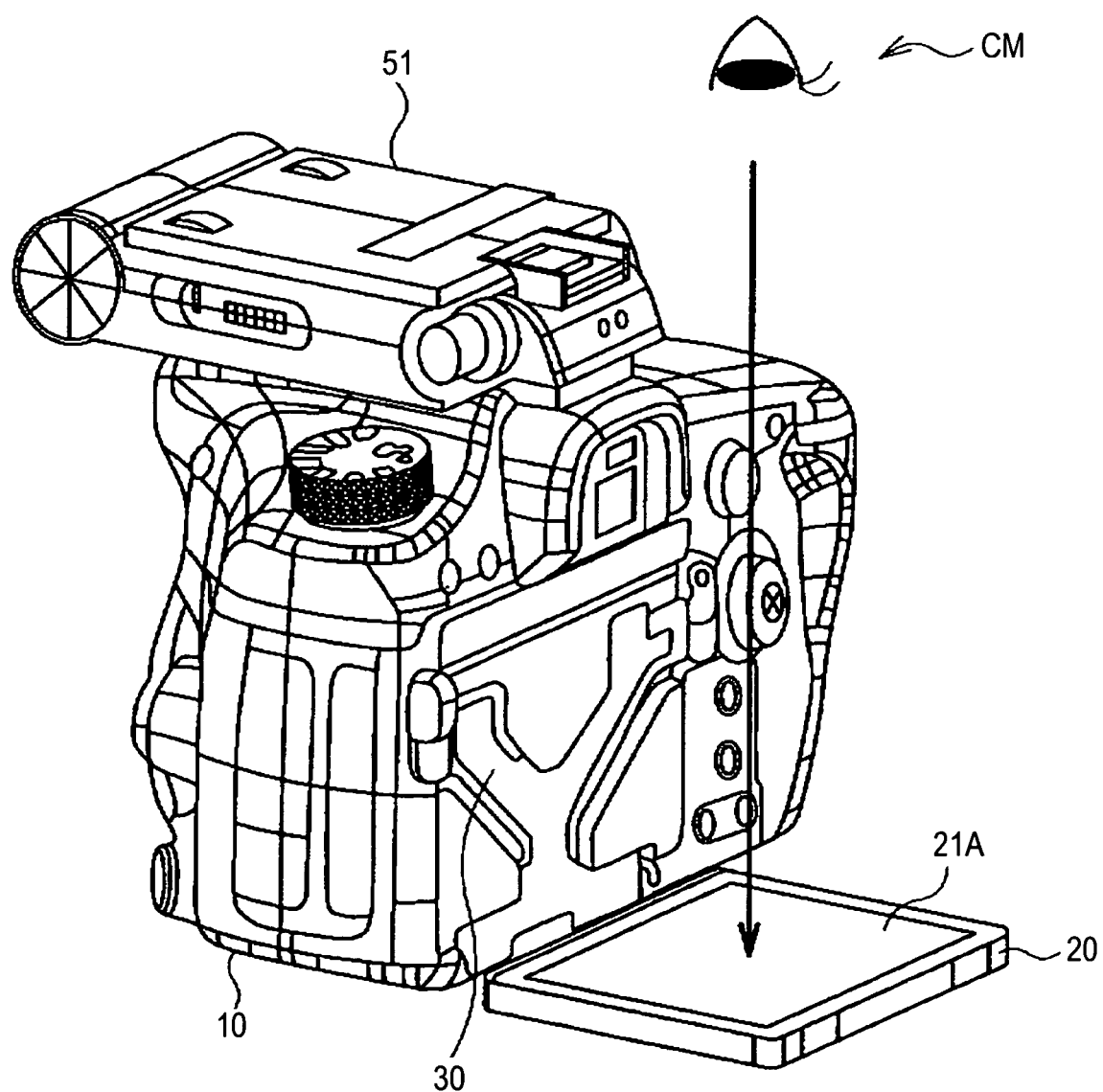
FIG. 18 is a perspective view illustrating a case where an accessory is used as a second example of the horizontal-position low-angle photographing.
Figure 19:
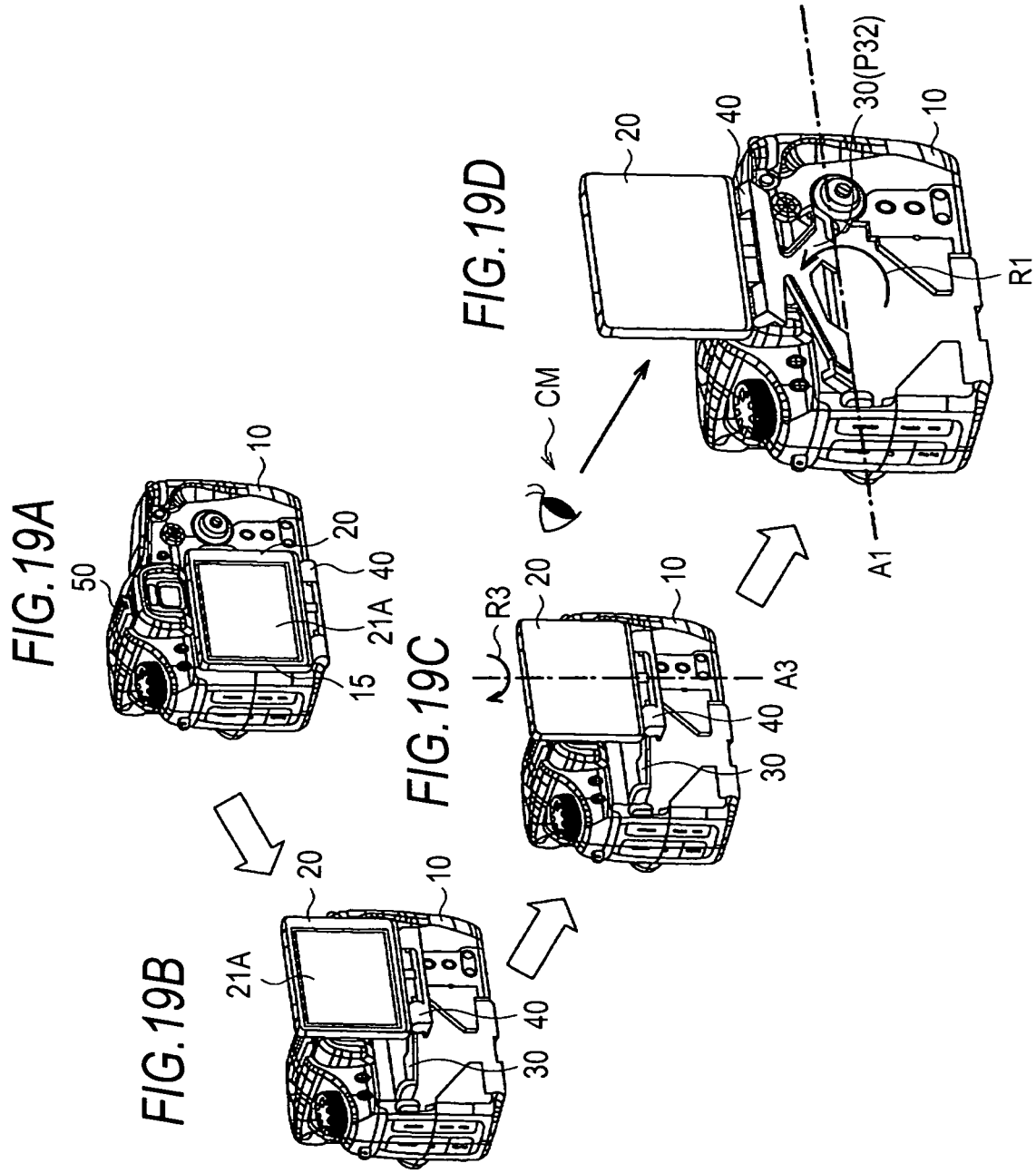
FIGS. 19A to 19D are perspective views illustrating a first example of vertical-position mirror-mode photographing.

FIG. 18 illustrates an example of horizontal-position low-angle photographing in a case where an accessory is used. In a case where an accessory 51 such as an strobo light emitting device that can be externally attached is attached to the accessory shoe 50 located on the upper face of the imaging apparatus 1, as illustrated in FIGS. 15A to 15C and 16, it is difficult to load the display unit 20 on the upper face (on the accessory shoe 50) of the imaging apparatus 1. In such a case, for example, as illustrated in FIG. 18, the display unit 20 is rotated around the second rotation axis A2 by 0° to 90° to the lower side (see FIG. 14B), and the display unit 20 is rotated around the third rotation axis A3 as is necessary, whereby the display screen 21A of the display unit 20 is arranged so as to face the upper side. Accordingly, the imaging apparatus 1 is set to a position below the positions of the eyes of a photographer CM by the photographer CM without contact or interference between the accessory 51 and the display unit 20, and the photographer CM can perform photographing while visually recognizing the display screen 21A of the display unit 20 from the upper side.

(First Example of Horizontal-Position Mirror-Mode Photographing)

FIGS. 19A to 19D illustrate an example of horizontal-position mirror-mode photographing. The "horizontal-position mirror-mode" is a method in which the imaging apparatus 1 is held in the landscape orientation, and the photographer is photographed as a subject while monitoring the display unit 20 placed toward the photographer.

First, as illustrated in FIG. 19A, the photographing apparatus 1 is set to a horizontal position, and the operation is started from a state in which the display screen 21A of the display unit 20 is set to the outer side (the rear face side), and the display unit 20 is housed in the housing portion 15. Next, as illustrated in FIG. 19B, similarly to the first example of the horizontal-position low-angle photographing, the display unit 20 is floated from the main body unit 10 by the operation illustrated in FIGS. 15A, 17A and 17B. Subsequently, as illustrated in FIG. 19C, by rotating the display unit 20 around the third rotation axis A3 to the left side by 180° as denoted by an arrow R3, the display screen 21A of the display unit 20 is arranged so as to face the front face. Thereafter, as illustrated in FIG. 19D, by rotating the hinge frame 30 up to the upper position P32, the display unit 20 is set to be located at a position higher than that of the upper face of the imaging apparatus 1. Accordingly, by allowing the imaging apparatus 1 to be supported by a tripod (not shown in the figure) or the like, the photographer CM can photograph himself or herself while checking the display unit 20.

Figure 20:
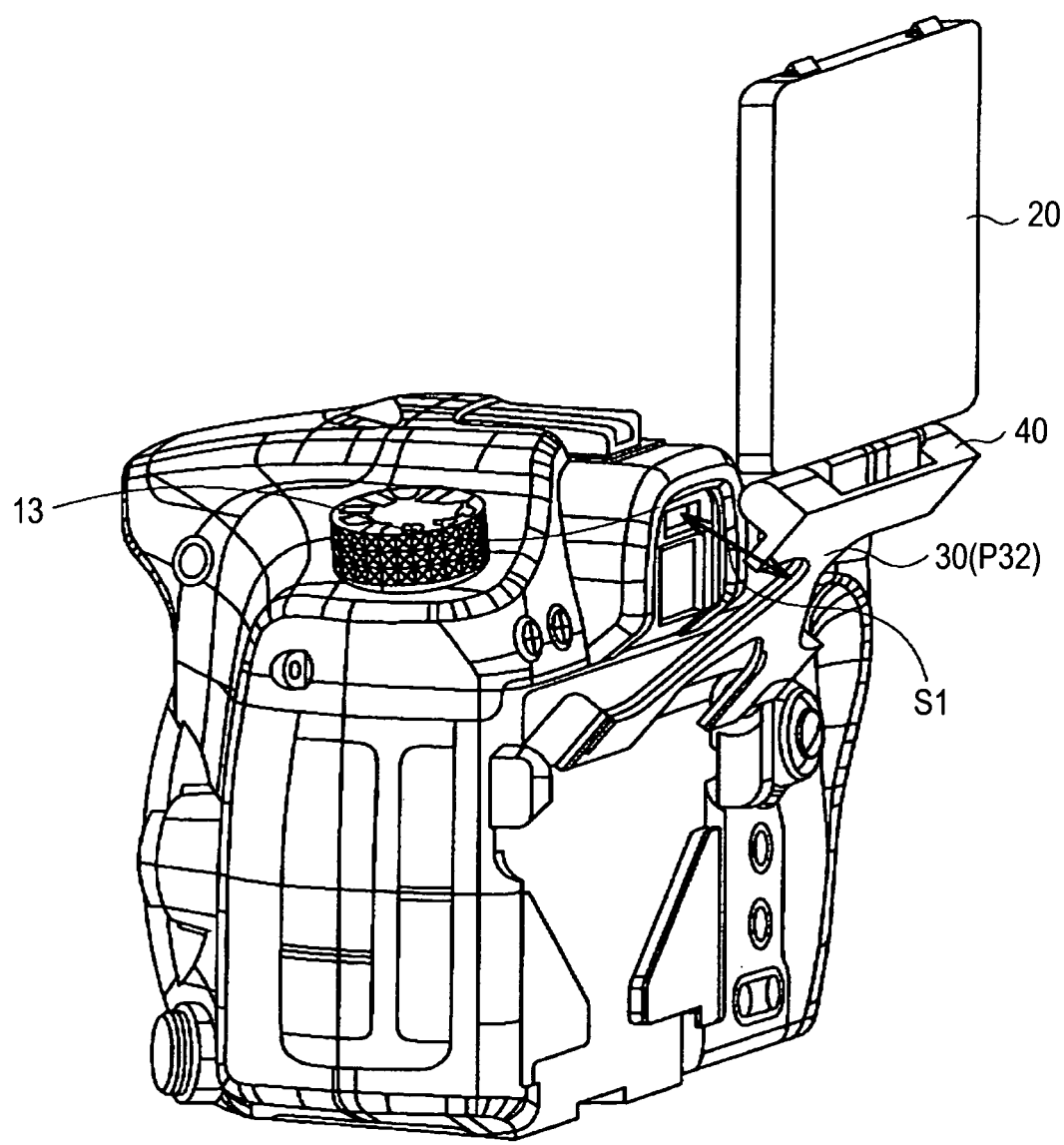
FIG. 20 is a perspective view illustrating detection of the hinge frame by using an eye sensor.

FIG. 20 is a perspective view illustrating detection of the hinge frame 30 by using the eye sensor 13. In a case where the hinge frame 30 is rotated up to the upper position P32 (see FIG. 19C), as denoted by an arrow S1 shown in FIG. 20, the eye sensor 13 detects that the hinge frame 30 is located at the upper position P32 and transmits a detection signal to the control unit 18 (see FIG. 11). On the other hand, in a case where the display unit 20 is rotated around the third rotation axis A3 to the left side by 180°, and the display screen 21A of the display unit 20 faces the front side (see FIG. 19B), the display unit rotation detecting sensor 44 detects that the display unit 20 is located at the reversed position P24 and transmits a detection signal to the control unit 18 (see FIG. 11). The control unit 18 displays a mirror image of the subject on the display unit 20 based on the detection results of the eye sensor 13 and the display unit rotation detecting sensor (see FIG. 11).

Originally, the eye sensor 13 detects an object located near the finder 12. Thus, when a photographer looks into the finder 12, the display operation of the display unit 20 is stopped. However, in a case where the rotation of the hinge frame 30 up to the upper position P32 is detected by the eye sensor 13, when the display of the display unit 20 is removed, there is inconvenience that it is difficult for the photographer as a subject in the mirror mode photographing to check the display unit 20. Thus, by controlling the display operation of the display unit 20 based on both detection results of the eye sensor 13 and the display unit rotation detecting sensor 44, as described above, the photographer CM can photograph himself or herself while checking the display unit 20 in the mirror mode photographing as illustrated in FIGS. 19A to 19D and 20, and whereby the convenience is improved.

In the description of the mirror mode photographing as above, it is assumed that the photographer as a subject photographs himself or herself while checking the display unit 20. However, as described above, since the window 35 is disposed in the combination unit 33 of the hinge frame 30, the display unit 20 is seen by a person as a subject, and simultaneously, the photographer can perform photographing by looking into the finder 12 from the window 35. According to this photographing method, both the photographer and the person as a subject can share a video. Accordingly, the photographing operation can be performed in an easy manner, whereby the degree of convenience for both the subject and the photographer is high.

(Second Example of Horizontal-Position Mirror-Mode Photographing)

FIGS. 21A and 21B illustrate another example of the vertical-position mirror-mode photographing. First, as illustrated in FIG. 21A, the photographing apparatus 1 is set to a horizontal position, and the operation is started from a state in which the display face of the display unit 20 is set to the outer side (the rear face side), and the display unit 20 is housed in the housing portion 15. Next, as illustrated in FIG. 21B, the display unit 20 is rotated around the second rotation axis A2 to the lower side by 180° as denoted by the arrow R2 so as to arrange the display face of the display unit 20 toward the front side. Accordingly, the photographer CM can photograph himself or herself while checking the display face 20.

(First Example of Vertical-Position and High-Angle and Low-Angle Photographing)

FIGS. 22A to 22D illustrate an example of horizontal-position high-angle and low-angle photographing. Here, the "horizontal-position high-angle" represents a photographing method in which the imaging apparatus 1 is held in the portrait orientation and is set to a high position (for example, above the head). The "vertical-position low-angle" represents a photographing method in which the imaging apparatus 1 is held in the portrait orientation and is set to a low position (for example, the abdomen).

In the case of the vertical-position high-angle photographing, first, as illustrated in FIG. 22A, the hinge frame 30 is rotated around the first rotation axis A1 to the upper side by 90° as denoted by the arrow R1. Next, as illustrated in FIG. 22B, by rotating the display unit 20 around the third rotation axis A3 to the lower side by 90° as denoted by the arrow R3, the display screen 21A of the display unit 20 is arranged so as to face the lower side. At this time, although the display unit 20 is located almost right above the finder 12 and the eye hood 14, a distance between the display unit 20 and the eye hood 14 is sufficiently long. Accordingly, there is no contact or interference between the display unit 20 and the eye hood 14. In addition, since the hinge frame 30 and the display unit 20 are perpendicular to each other, there is no contact or interference between the display unit 20 and the hinge frame 30. Accordingly, the photographer CM can set the photographing apparatus 1 above the head and perform photographing while checking the display screen 21A of the display unit 20 from the lower side.

Furthermore, as illustrated in FIG. 22C, by rotating the display unit 20 around the third rotation axis A3 to the lower side by 180° as denoted by the arrow R3, the display face of the display unit 20 can be arranged so as to face the front side. Even in such a case, since the distance between the display unit 20 and the eye hood 14 is sufficiently long, there is no contact or interference between the display unit 20 and the eye hood 14. In addition, since the hinge frame 30 and the display unit 20 are perpendicular to each other, there is no contact or interference between the display unit 20 and the hinge frame 30.

In the case of the vertical-position low-angle photographing, first, as illustrated in FIG. 22A, the hinge frame 30 is rotated around the first rotation axis A1 to the upper side by 90° as denoted by the arrow R1. Next, as illustrated in FIG. 22D, by rotating the display unit 20 around the third rotation axis A3 to the upper side by 90° as denoted by the arrow R3, the display screen 21A of the display unit 20 is arranged so as to face the upper side. At this time, although the display unit 20 is located almost right above the finder 12 and the eye hood 14, the distance between the display unit 20 and the eye hood 14 is sufficiently long. Accordingly, there is no contact or interference between the display unit 20 and the eye hood 14. In addition, since the hinge frame 30 and the display unit 20 are perpendicular to each other, there is no contact or interference between the display unit 20 and the hinge frame 30. Accordingly, the photographer CM can set the photographing apparatus 1 below the positions of the eyes of the photographer CM and perform photographing while checking the display screen 21A of the display unit 20 from the upper side.

(Second Example of Vertical-Position and High-Angle and Low-Angle Photographing)

FIGS. 23 to 26 represent an example in which the display unit 20 is rotated near the optical axis of the imaging lens in the vertical-position high-angle and low-angle photographing.

Figure 23:
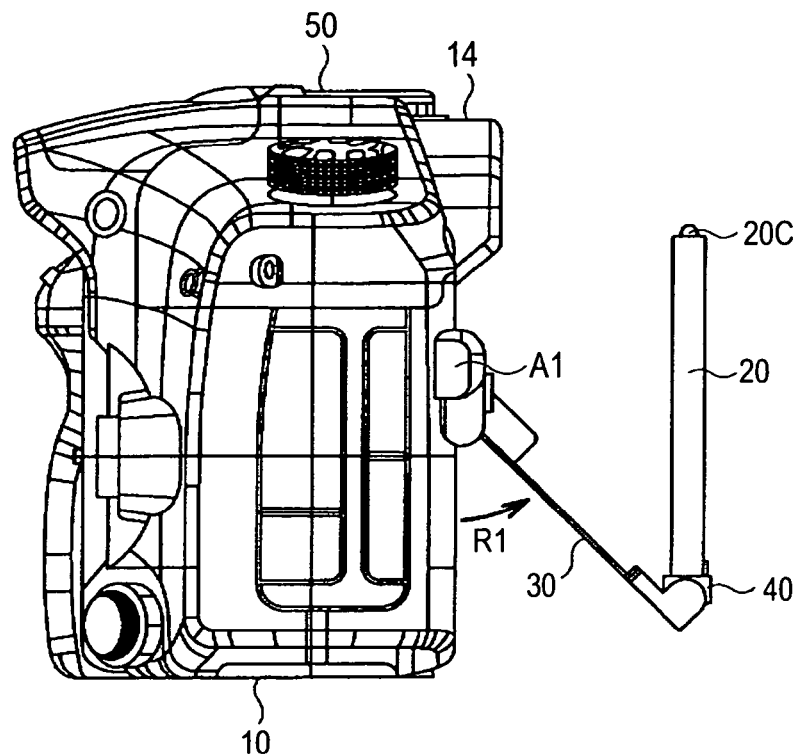
FIG. 23 is a side view illustrating an example in which the display unit is rotated near the optical axis of an imaging lens in the operation sequence as a second example of the vertical-position high-angle and low-angle photographing.
Figure 24:
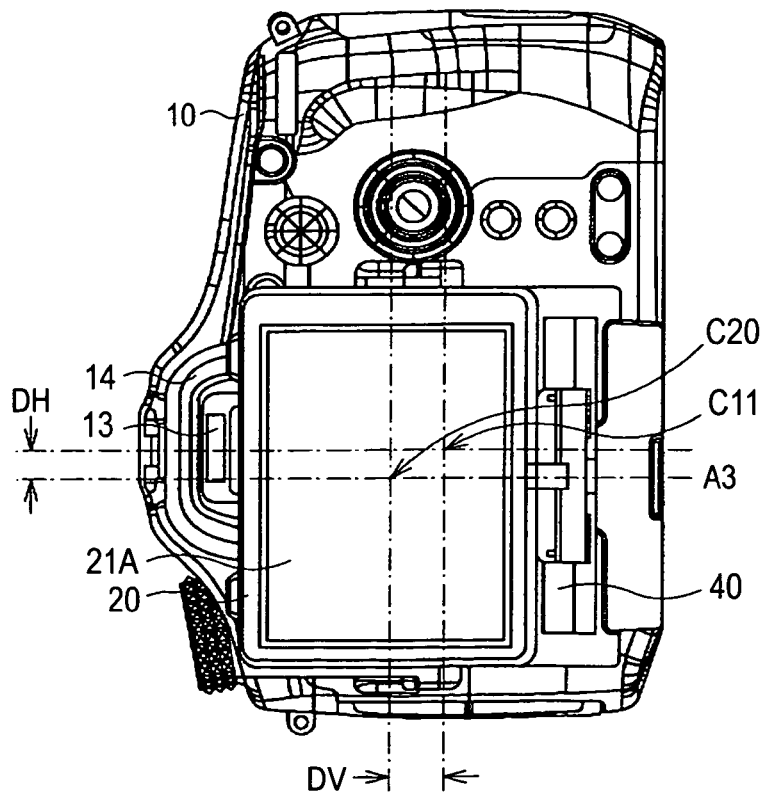
FIG. 24 is a top view of FIG. 23.

In the case of the vertical-position high-angle photographing, first, as illustrated in FIGS. 23 and 24, the hinge frame 30 is rotated around the first rotation axis A1 by an angle that is smaller than 90°, for example, about 40°, whereby a state is formed in which the display unit 20 is floated from the main body unit 10. Next, as illustrated in FIG. 25A, by rotating the display unit 20 around the third rotation axis A3 to the lower side as denoted by the arrow R3, the display face of the display unit 20 is arranged so as to face the lower side of the inclination. Accordingly, the photographer CM can set the imaging apparatus 1 above the head and can perform photographing while checking the display screen 21A of the display unit 20 from the lower side of the inclination.

At this time, as illustrated in FIG. 24, a deviation DH between the center C20 of the display unit 20 and the center C11 of the imaging lens 11 in the horizontal position direction does not change even in a case where the rotation angle of the hinge frame 30 is large. On the other hand, a deviation DV in the vertical position direction increases as the rotation angle of the hinge frame 30 is increased. Accordingly, by appropriately adjusting the rotation angle of the hinge frame 30, the deviation DV in the vertical position direction is decreased, whereby the display unit 20 can be located near the optical axis of the imaging lens 11. However, at a position close to the optical axis, an angle formed by the hinge frame 30 and the display unit 20 (the third rotation axis A3 of the display unit 20) is smaller than 90°. Accordingly, in a case where any notch 34 is not arranged in the hinge frame 30, by rotating the display unit 20 around the third rotation axis A3, there is a concern that the display unit 20 is brought into contact with or interferes with the hinge frame 30.

Figure 26:
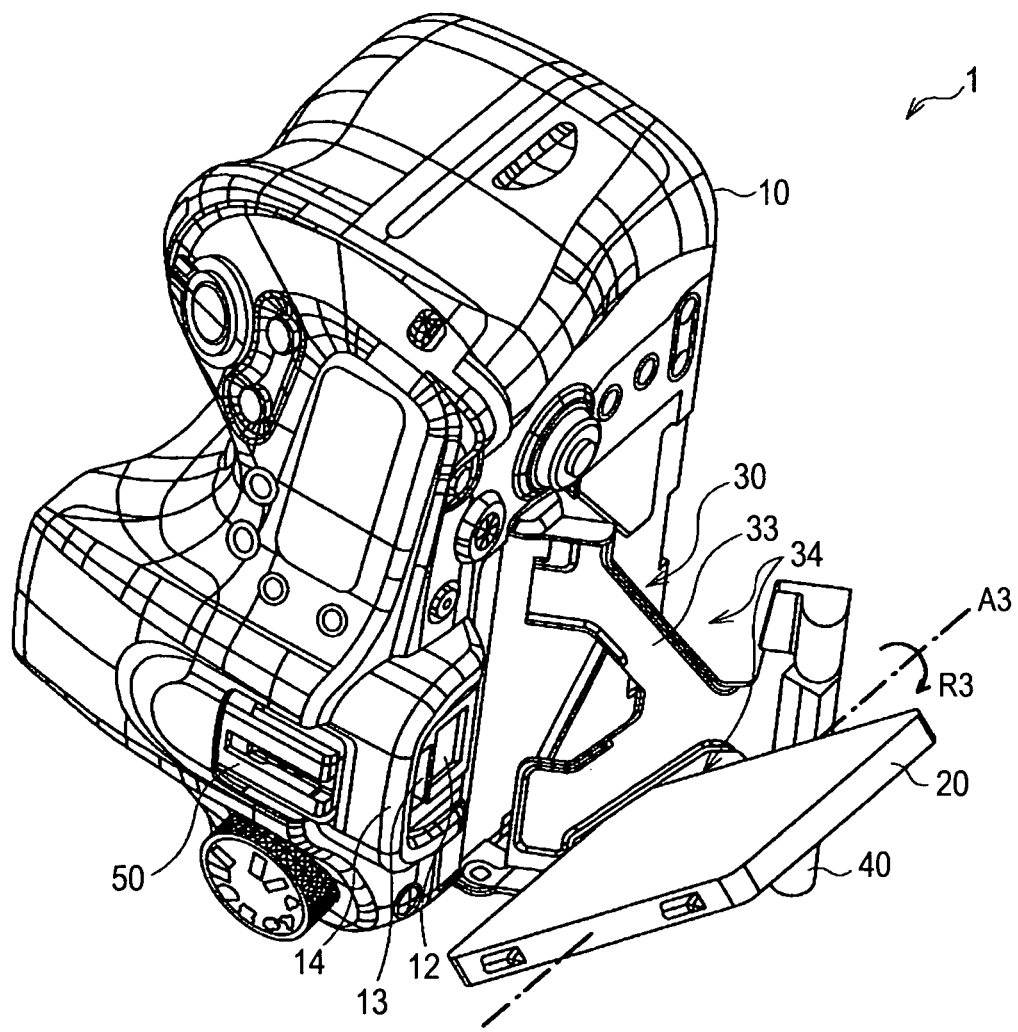
FIG. 26 is a perspective view illustrating the operation of a notch of the hinge frame.

Here, as illustrated in FIG. 26, the notches 34 are disposed between both end portions 32A and 32B of the second side 32 other than the center portion 32C and both ends 31A and 31B of the first side 31 in the combination unit 33 of the hinge frame 30. Accordingly, contact or interference between the display unit 20 and the hinge frame 30 is suppressed when the display unit 20 is rotated around the third rotation axis A3, and whereby the display unit 20 can be rotated near the optical axis of the imaging lens 11. Therefore, a difference between the display of the display unit 20 and the imaging using the imaging lens 11 can be decreased, whereby the photographer CM can perform photographing while checking the display unit 20 with the same sense as that acquired by directly looking into the finder 12. Furthermore, in a case where the angle formed by the hinge frame 30 and the display unit 20 is smaller than 90°, when the notch 34 of the hinge frame 30 is disposed within the rotation range of the display unit 20 around the third rotation axis A3, contact or interference between the display unit 20 and the hinge frame 30 can be reliably avoided.

In addition, since the rotation angle of the hinge frame 30 is smaller than 90°, the amount of floating of the display unit 20 from the main body unit 10 is small, whereby the display unit 20 can be rotated around the third rotation axis A3 near the main body unit 10. Therefore, it is possible to change the inclination angle of the display unit 20 in a narrow space.

In the case of the vertical-position low-angle photographing, first, as illustrated in FIG. 23, similarly to the above-described vertical-position high-angle photographing, the hinge frame 30 is rotated around the first rotation axis A1 by an angle that is smaller than 90°, for example, about 40°, whereby the display unit 20 is in a state of being floated from the main body unit 10. Next, as illustrated in FIG. 25B, by rotating the display unit 20 around the third rotation axis A3 to the upper side as denoted by the arrow R3, the display screen 21A of the display unit 20 is arranged so as to face the upper side of the inclination. Accordingly, the photographer CM can set the imaging apparatus 1 above the head and can perform photographing while checking the display screen 21A of the display unit 20 from the upper side of the inclination.

Even in this case, the notches 34 are disposed between both end portions 32A and 32B of the second side 32 other than the center portion 32C and both ends 31A and 31B of the first side 31 in the combination unit 33 of the hinge frame 30. Accordingly, similarly to the case of the vertical-position high-angle photographing, contact or interference between the display unit 20 and the hinge frame 30 is suppressed when the display unit 20 is rotated around the third rotation axis A3, and whereby the display unit 20 can be rotated near the optical axis of the imaging lens 11. Therefore, a difference between the display of the display unit 20 and the imaging using the imaging lens 11 can be decreased as much as possible, whereby the photographer CM can perform photographing while checking the display unit 20 with the same sense as that acquired by directly looking into the finder 12.

Figure 27:
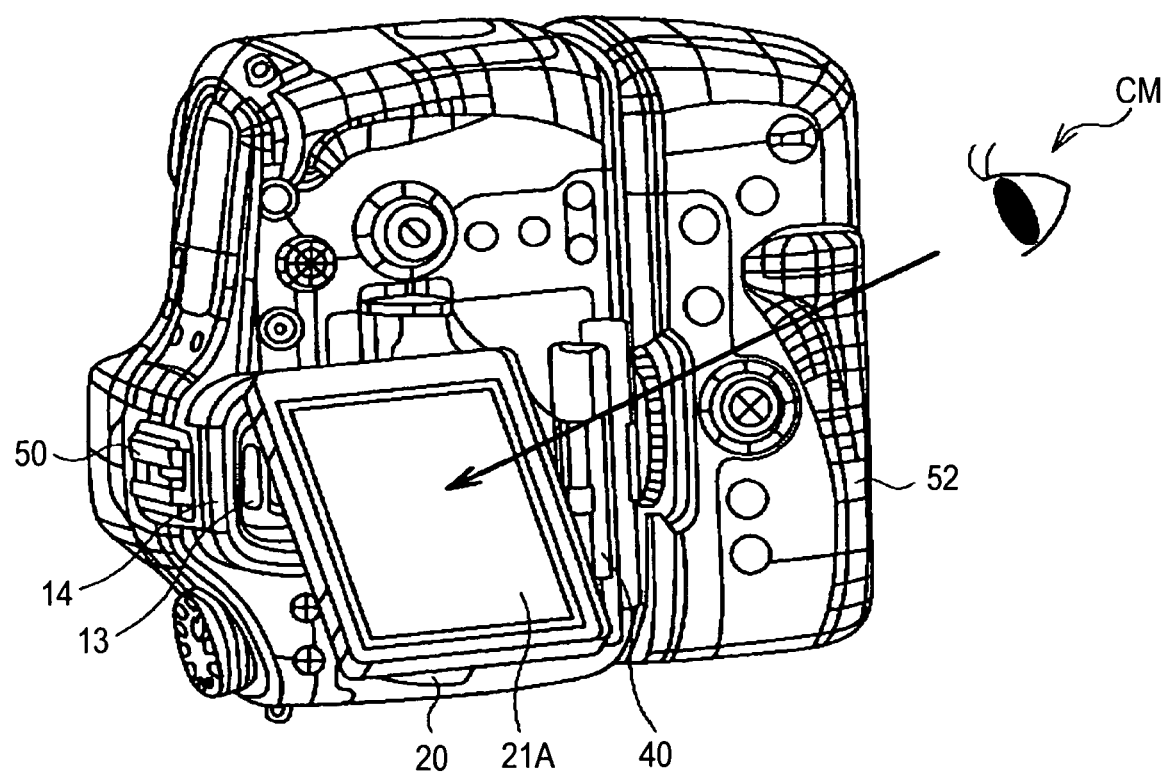
FIG. 27 is a perspective view of a case where an accessory grip is installed in FIG. 25B.

In addition, as illustrated in FIG. 27, even in a case where an accessory grip (vertical-position controller grip) 52 is installed to the lower face of the imaging apparatus 1, the display unit 20 can be rotated around the third rotation axis A3 without the display unit 20 and the accessory grip 52 being brought into contact or interfering with each other.

Figure 28A:
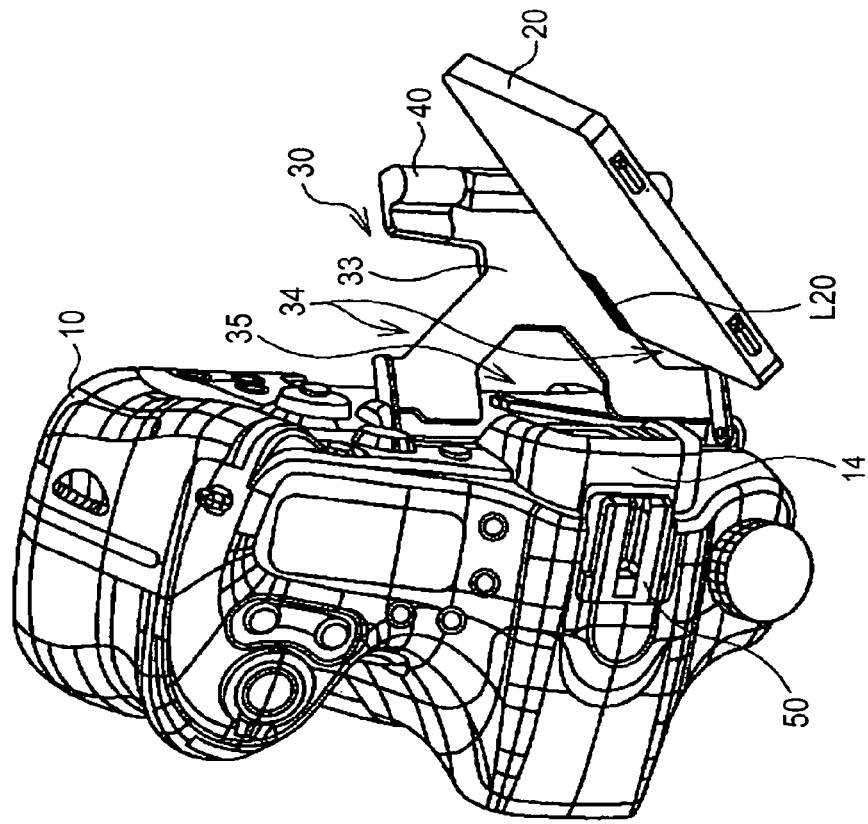
FIGS. 28A and 28B are perspective views illustrating the operations of T-shaped and Y-shaped hinge frames.
Figure 28B:
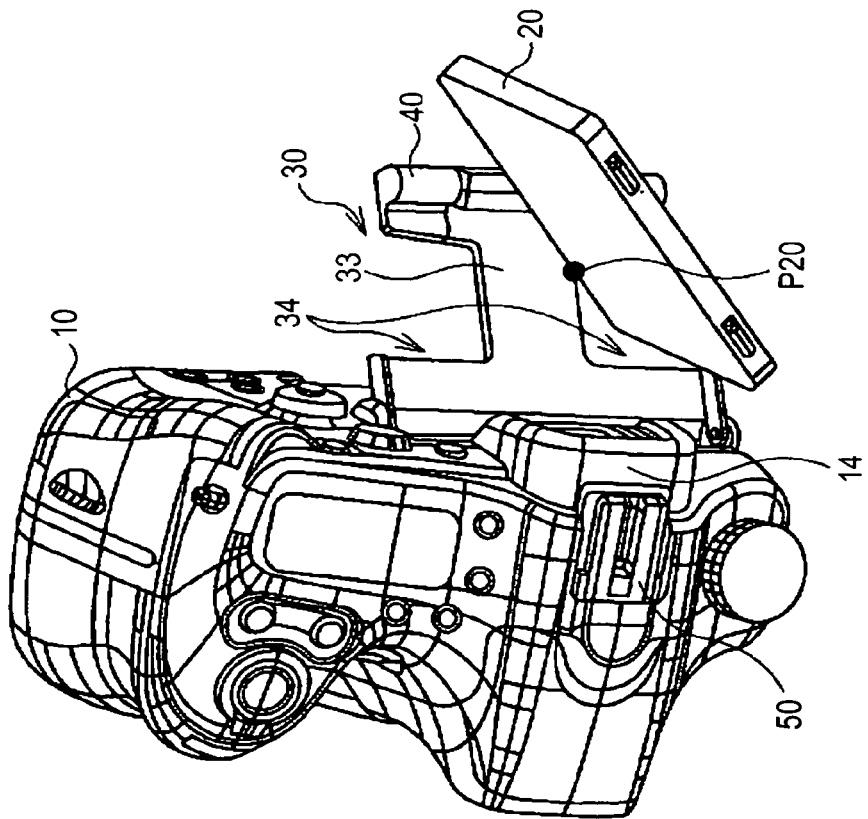

FIGS. 28A and 28B illustrate the operations of cases where the combination unit 33 of the hinge frame 30 forms a "T" shape and a "Y" shape. In FIG. 28A, the window 35 is not shown. As illustrated in FIG. 28A, in a case where the combination unit 33 of the hinge frame 30 forms the "T" shape, when the display unit 20 is rotated around the third rotation axis A3, the lower side 20A of the display unit 20 and the combination unit 33 of the hinge frame 30 are in touch with each other at a point P20.

On the other hand, as illustrated in FIG. 28B, in a case where the combination unit 33 of the hinge frame 30 forms the "Y" shape, by appropriately adjusting the shape of the notches 34, the lower side 20A of the display unit 20 and the combination unit 33 of the hinge frame 20 can be in touch with each other on a line L20. Accordingly, in the case of the "Y" shape, the pressure from the display unit 20 can be stably received. In addition, there is an advantage that the "Y" shape has strength against torsion that is higher than the "T" shape.

As above, according to this embodiment, the notches 34 are disposed between both end portions 32A and 32B of the second side 32 other than the center portion 32C and both ends 31A and 31B of the first side 31 in the combination unit 33 of the hinge frame 30. Accordingly, contact or interference between the display unit 20 and the hinge frame 30 is suppressed when the display unit 20 is rotated around the third rotation axis A3, and whereby the inclination angle can be changed regardless of the vertical and horizontal directions of the display unit 20. In addition, the display unit 20 can be rotated around the third rotation axis A3 near the optical axis of the imaging lens 11, whereby a difference between the display of the display unit 20 and the imaging using the imaging lens 11 can be decreased. Therefore, a photographer can perform photographing while checking the display unit 20 with the same sense as that acquired by directly looking into the finder 12, whereby the convenience is improved.

In addition, since the window 35 is arranged at the center portion of the side of the first side 31 of the combination unit 33 of the hinge frame 30, in the mirror mode photographing, a person as a subject is allowed to check the display screen 21A of the display unit 20, and the photographer can perform photographing while checking the subject from the finder 12.

Furthermore, since the combination unit 33 of the hinge frame 30 forms the "Y" shape, the lower side 20A of the display unit 20 and the combination unit 33 of the hinge frame 30 are in contact with each other on the line L20. Accordingly, the pressure from the display unit 20 can be stably received, and the strength of the hinge frame 30 can be increased.

In addition, since the first rotation axis A1 is deviated to the second rotation axis A2 side from the position of the movable side 20B that is at the housing position of the display unit 20. Accordingly, by performing only one operation of lifting up the rotary hinge unit 40 with a finger, the hinge frame 30 can be rotated around the first rotation axis A1, and the movable side 20B of the display unit 20 can be floated. Therefore, the display unit 20 can be loaded on the upper face of the imaging apparatus 1 in an easy manner without performing complicated operations.

Furthermore, below the eye hood 14 of the main body unit 10, the slope 17 is disposed. Accordingly, when the movable side 20B of the display unit 20 is floated, there is no case in which the movable side 20B of the display unit 20 is brought into contact with the lower portion of the eye hood 14 so as to block the uplift thereof. Accordingly, the display unit 20 can be in the state of being floated from the main body unit 10 by using the slope 17 as a guide face without performing any special operation.

In addition, by controlling the display operation of the display unit 20 based on both detection results of the eye sensor 13 and the display unit rotation detecting sensor 44 by using the control unit 18, a photographer can photograph himself or herself while checking the display unit 20 in the mirror mode photographing, and whereby the convenience is improved.

Second Embodiment

Figure 29:
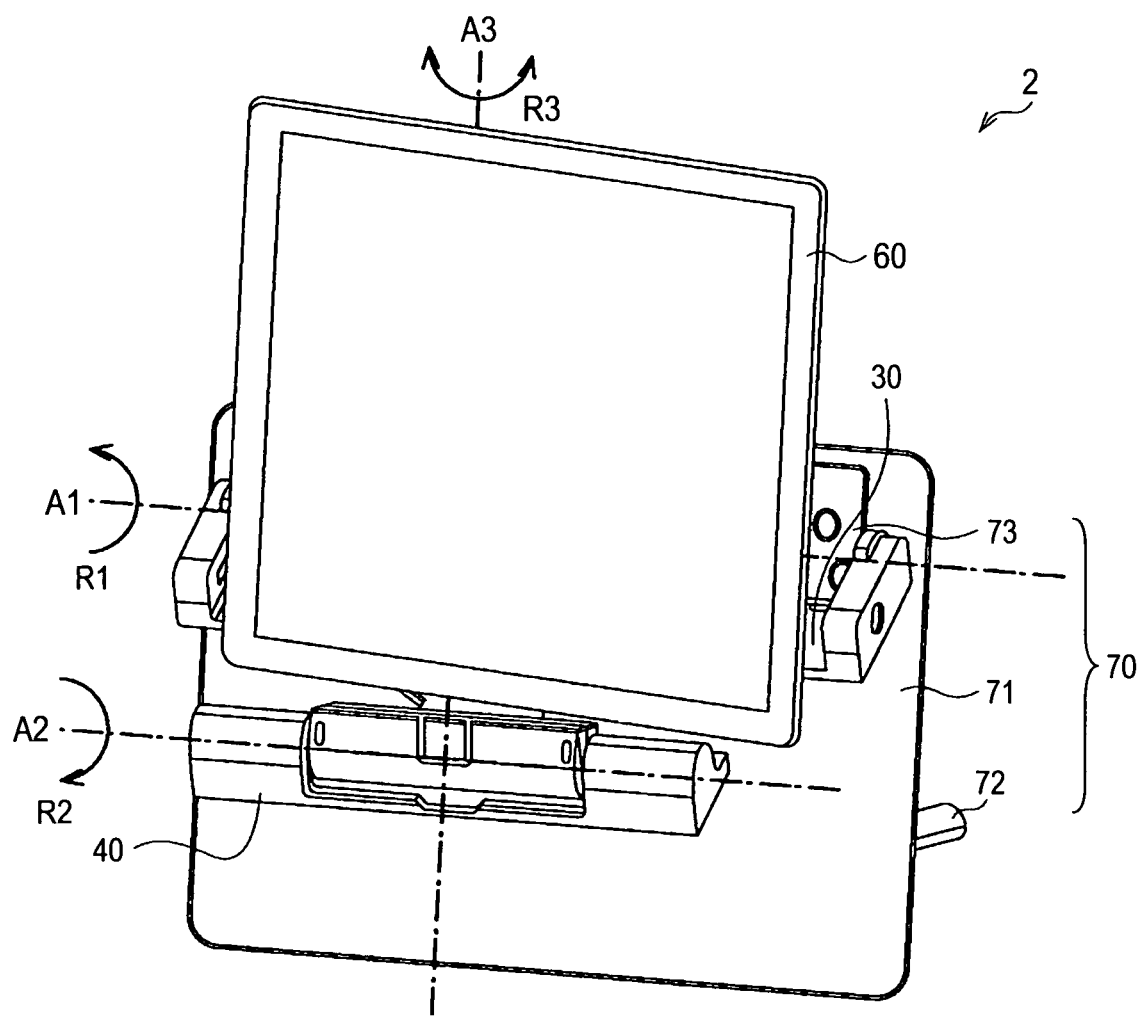
FIG. 29 is a perspective view illustrating the exterior appearance of a picture frame as a display apparatus according to a second embodiment of the present disclosure.

FIG. 29 illustrates the exterior appearance of a display apparatus (picture frame) according to a second embodiment of the present disclosure. This display apparatus 2 includes a display unit 60 that displays an image (including a still image and a moving image) and a main body unit 70 that supports the display unit 60. The display unit 60 and the main body unit 70 are combined together through the hinge frame 30 and the rotary hinge unit 40 that are the same as those of the first embodiment. The same reference numeral is assigned to each constituent element corresponding to the first embodiment for the description.

The display unit 60 has the same configuration as the display unit 20 according to the first embodiment. The main body unit 70 includes a support rod 72 on the rear face of a rectangular plate-shaped support unit 71. The support rod 72 is used for supporting the support unit 71 in a state of obliquely standing on an installation face. On the front face of the support unit 71, one pair of fixation units 73 that are used for fixing the hinge frame 30 so as to be rotatable are disposed. In FIG. 29, a state is shown in which the display apparatus 2 is at the horizontal position (in the landscape orientation) with the longer side of the main body unit 70 arranged to the lower side. However, a vertical position (the landscape orientation) may be used in which the shorter side of the main body unit 70 is arranged to the lower side.

The hinge frame 30 and the rotary hinge unit 40 are configured similarly to the first embodiment. Therefore, according to the display apparatus 2, the inclination angle can be changed regardless of the vertical and horizontal directions of the display unit 60.

Particularly in the display apparatus 2, similarly to a case where the imaging apparatus 1 is set to the vertical position, and the display unit 20 is rotated near the optical axis (FIGS. 23 to 26), the display unit 60 is not separated much from the main body unit 70, and accordingly, there is a significant advantage that the display unit 20 can be rotated through the third rotation axis A3 near the main body unit 70. In other words, even in a case where there is no marginal space for drawing out the display unit 60 in front, the inclination angle of the display unit 60 can be changed.

As above, although the embodiments of the present disclosure have been described, the present disclosure is not limited thereto, and various changes can be made therein. For example, in the above-described first embodiment, a case has been described in which the slope 17 is disposed below the eye hood 14. However, it is not necessary for the slope 17 to be disposed below the eye hood 14 and may be disposed on the casing (rear cover) located on the rear face of the main body unit 10 or in another member located on the rear face.

In addition, for example, in the first embodiment, although the horizontal-position mirror mode photographing has been described, the vertical-position mirror mode may be similarly performed. Furthermore, in the above-described first embodiment, an example has been described in which the display unit 20 is rotated near the optical axis of the imaging lens 11 in the vertical-position high-angle and low-angle photographing. However, also for the horizontal position, similarly, the display unit 20 may be rotated near the optical axis of the imaging lens 11.

Furthermore, for example, in the above-described first embodiment, although a case has been described in which the fixation unit 16 is a protruded portion protruding from the rear face of the main body unit 10, the fixation unit 16 may be buried in the main body unit 10. In such a case, the first rotation axis A1 of the hinge frame 30 can be buried in the main body unit 10. Accordingly, a fine view can be achieved, and a compact configuration that does not degrade the operability can be formed.

In addition, for example, in the above-described first embodiment, a digital single lens reflex camera has been described as an example of the imaging apparatus. However, the present disclosure can be applied to other imaging apparatuses such as a compact camera and a video camera. Furthermore, in the above-described second embodiment, the picture frame has been described as an example of the display apparatus. However, the present disclosure can be applied to other display apparatuses such as a large-sized television set, a middle-sized to small-sized television set, a cellular phone, a car navigation apparatus, and an electric scoreboard.

Furthermore, for example, in the above-described embodiments, a case has been described in which the display unit 20 is configured by a liquid crystal display device. However, the display unit 20 may be configured by using another display device other than the liquid crystal such as plasma, organic EL (Electroluminescence), inorganic EL, electro-deposition, or electrochromic.

The present disclosure contains subject matter related to that disclosed in Japanese Priority Patent Application JP 2010-224898 filed in the Japan Patent Office on Oct. 4, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   a main body unit that includes an imaging lens;
   a display unit that displays an image picked up through the imaging lens;
   a hinge frame that includes a first side fixed to the main body unit so as to be rotatable around a first rotation axis, a second side facing the first side, and a combination unit, which has a notch between a first end and a second end of the second side other than a center portion and a first end and a second end of the first side, disposed between the first side and the second side; and
   a rotary hinge unit that connects the second side of the hinge frame and one side of the display unit and rotates the display unit around a second rotation axis extending along the second side and a third rotation axis extending in a direction perpendicular to the second rotation axis,
   wherein the hinge frame can be rotated around the first rotation axis between a lower position at which the hinge frame is brought into contact with a rear face of the main body unit and an upper position that is close to a finder, and
   wherein the main body unit includes a hinge frame opening or closing detecting sensor that detects whether or not the hinge frame is located at the upper position.

2. The imaging apparatus according to claim 1, wherein the notch of the hinge frame includes a slope that intersects the first side between a position near the first and the second ends of the first side and a position near a center portion of the second side.

3. The imaging apparatus according to claim 1, wherein the notch of the hinge frame is disposed within a rotation range of the display unit around the third rotation axis in a case where an angle formed by the hinge frame and the display unit is smaller than 90.degree.

4. The imaging apparatus according to claim 1, wherein the rotary hinge unit includes:
   a hinge rotating member that is fixed to the second side of the hinge frame so as to be rotatable and rotates the display unit around the second rotation axis;
   a rotation shaft member that is disposed in a center portion of the hinge rotating member in a longitudinal direction and rotates the display unit around the third rotation axis; and
   a fixation plate that combines the rotation shaft member and one side of the display unit.

5. The imaging apparatus according to claim 1, wherein the first rotation axis is deviated to a side of the second rotation axis from a position of a movable side that faces an attachment side of the rotary hinge unit of the display unit at a housing position of the display unit.

6. The imaging apparatus according to claim 5,
   wherein the main body unit includes a slope on the rear face, and
   wherein the slope has a lowest position on a side of the movable side at the housing position of the display unit, and position of the slope is higher as the position is located farther from the lowest position.

7. The imaging apparatus according to claim 6,
wherein the main body unit includes the finder and an eye hood that surrounds an upper side and left and right sides of the finder on the rear face, and
wherein the slope is disposed below the eye hood.

8. The imaging apparatus according to claim 7, wherein the display unit includes a protrusion at a position of the movable side that faces the slope.

9. The imaging apparatus according to claim 1,
wherein the main body unit includes the finder and an eye sensor, which is located in the vicinity of the finder, on the rear face, and
wherein the eye sensor also serves as the hinge frame opening or closing detecting sensor.

10. The imaging apparatus according to claim 1, wherein the combination unit includes a window disposed at a center portion of the first side.

11. The imaging apparatus according to claim 1, wherein the combination unit forms a "Y" shape.

12. The imaging apparatus according to claim 1,
wherein the display unit can be rotated between a non-reversed position and a reversed position that is reversed by 180.degree. from the non-reversed position in accordance with rotation along the third rotation axis,
wherein a rotation shaft member includes a display unit rotation detecting sensor that detects whether or not the display unit is located at the reversed position, and
wherein the main body unit includes a control unit that controls the display unit based on detection results of the hinge frame opening or closing detecting sensor and the display unit rotation detecting sensor.

13. The imaging apparatus according to claim 12, wherein, in a case where the hinge frame opening or closing detecting sensor detects that the hinge frame is located at the upper position, and the display unit rotation detecting sensor detects that the display unit is located at the reversed position, the control unit displays a mirror image of a subject on the display unit.

14. The imaging apparatus according to claim 1, wherein the display unit includes:
a display device;
a front plate that is disposed on a front face of the display device;
a double-coated adhesive tape that is disposed over the entire periphery of the display device between the display device and the front plate for sealing;
a casing that coats a side face and a rear face of the display device;
a relay substrate that is disposed between the rear face of the display device and the casing; and
a first packing that is disposed on the periphery of the relay substrate.

15. The imaging apparatus according to claim 14, further comprising:
a cable that connects the relay substrate and the main body unit through the hinge frame and a hinge rotating member;
a second packing that is disposed in a portion in which the cable is inserted into the display unit from the hinge rotating member; and
a third packing that is disposed in a portion in which the cable is inserted into the hinge frame from the main body unit.

16. A display apparatus comprising:
a display unit that displays an image;
a main body unit that supports the display unit;
a hinge frame that includes a first side fixed to the main body unit so as to be rotatable around a first rotation axis, a second side facing the first side, and a combination unit, which has a notch between a first end and a second end of the second side other than a center portion and a first end and a second end of the first side, disposed between the first side and the second side; and
a rotary hinge unit that connects the second side of the hinge frame and one side of the display unit and rotates the display unit around a second rotation axis extending along the second side and a third rotation axis extending in a direction perpendicular to the second rotation axis,
wherein the main body unit includes a finder and an eye sensor, which is located in the vicinity of the finder, on a rear face of the main body unit, and
wherein the eye sensor also serves as a hinge frame opening or closing detecting sensor.

17. An imaging apparatus comprising:
a main body unit that includes an imaging lens;
a display unit that displays an image picked up through the imaging lens;
a hinge frame that includes a first side fixed to the main body unit so as to be rotatable around a first rotation axis, a second side facing the first side, and a combination unit, which has a notch between a first end and a second end of the second side other than a center portion and a first end and a second end of the first side, disposed between the first side and the second side; and
a rotary hinge unit that connects the second side of the hinge frame and one side of the display unit and rotates the display unit around a second rotation axis extending along the second side and a third rotation axis extending in a direction perpendicular to the second rotation axis,
wherein the combination unit forms a "Y" shape.

* * * * *